(12) United States Patent
Cheney et al.

(10) Patent No.: US 11,085,102 B2
(45) Date of Patent: *Aug. 10, 2021

(54) COATING COMPOSITIONS

(71) Applicant: Oerlikon Metco (US) Inc., Westbury, NY (US)

(72) Inventors: Justin Lee Cheney, Encinitas, CA (US); Grzegorz Jan Kusinski, Houston, TX (US)

(73) Assignee: Oerlikon Metco (US) Inc., Westbury, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/156,248

(22) Filed: Oct. 10, 2018

(65) Prior Publication Data

US 2019/0144976 A1 May 16, 2019

Related U.S. Application Data

(63) Continuation of application No. 14/278,944, filed on May 15, 2014, now Pat. No. 10,100,388, which is a
(Continued)

(51) Int. Cl.
| | |
|---|---|
| *C22C 19/05* | (2006.01) |
| *B23K 35/30* | (2006.01) |
| *B23K 35/02* | (2006.01) |
| *C22C 30/00* | (2006.01) |
| *B22F 3/115* | (2006.01) |

(52) U.S. Cl.
CPC ............ *C22C 19/056* (2013.01); *B22F 3/115* (2013.01); *B23K 35/0261* (2013.01); *B23K 35/3033* (2013.01); *C22C 19/05* (2013.01); *C22C 19/055* (2013.01); *C22C 30/00* (2013.01); *Y10T 428/1275* (2015.01);
(Continued)

(58) Field of Classification Search
None
See application file for complete search history.

(56) References Cited

U.S. PATENT DOCUMENTS

| | | |
|---|---|---|
| 2,043,952 A | 6/1936 | Ffield |
| 2,156,306 A | 5/1939 | Rapatz |

(Continued)

FOREIGN PATENT DOCUMENTS

| | | |
|---|---|---|
| CN | 86102537 | 9/1987 |
| CN | 1033292 | 6/1989 |

(Continued)

OTHER PUBLICATIONS

Audouard, et al., Mar. 26-31, 2000, Corrosion Performance and Field Experience With Super Duplex and Super Austenitic Stainless Steels in FGD Systems, CORROSION 2000, 8 pp.
(Continued)

*Primary Examiner* — Xiaobei Wang
(74) *Attorney, Agent, or Firm* — Knobbe, Martens, Olson & Bear, LLP

(57) ABSTRACT

Compositions are provided that exhibit an austenitic nickel microstructure. The compositions comprise Ni, Cr, Mo and at least one element selected from the group consisting of Al, Si, and Ti. Feedstock having the composition may be in the form of a cored wire or wires, a solid wire or wires, or a powder.

20 Claims, 11 Drawing Sheets

Related U.S. Application Data continuation of application No. PCT/US2012/070398, filed on Dec. 18, 2012.

(60) Provisional application No. 61/581,841, filed on Dec. 30, 2011, provisional application No. 61/601,755, filed on Feb. 22, 2012, provisional application No. 61/604,596, filed on Feb. 29, 2012.

(52) U.S. Cl.
CPC ............... Y10T 428/12674 (2015.01); Y10T 428/12806 (2015.01); Y10T 428/12826 (2015.01)

(56) References Cited

U.S. PATENT DOCUMENTS

| | | | |
|---|---|---|---|
| 2,608,495 | A | 8/1952 | Barry |
| 2,873,187 | A | 2/1959 | Dyrkaez et al. |
| 2,936,229 | A | 5/1960 | Shepard |
| 3,024,137 | A | 3/1962 | Witherell |
| 3,113,021 | A | 12/1963 | Witherell |
| 3,181,970 | A | 5/1965 | Witherell et al. |
| 3,303,063 | A | 2/1967 | Pietryka et al. |
| 3,448,241 | A | 6/1969 | Buckingham et al. |
| 3,554,792 | A | 1/1971 | Johnson |
| 3,650,734 | A | 3/1972 | Kantor et al. |
| 3,819,364 | A | 6/1974 | Frehn |
| 3,843,359 | A | 10/1974 | Fiene et al. |
| 3,859,060 | A | 1/1975 | Eiselstein et al. |
| 3,942,954 | A | 3/1976 | Frehn |
| 3,975,612 | A | 8/1976 | Nakazaki et al. |
| 4,010,309 | A | 3/1977 | Peterson |
| 4,017,339 | A | 4/1977 | Okuda et al. |
| 4,042,383 | A | 8/1977 | Petersen et al. |
| 4,066,451 | A | 1/1978 | Rudy |
| 4,110,514 | A | 8/1978 | Nicholson |
| 4,214,145 | A | 7/1980 | Zvanut et al. |
| 4,235,630 | A | 11/1980 | Babu |
| 4,240,827 | A | 12/1980 | Aihara |
| 4,255,709 | A | 3/1981 | Zatsepium et al. |
| 4,277,108 | A | 7/1981 | Wallace |
| 4,285,725 | A | 8/1981 | Gysel |
| 4,297,135 | A | 10/1981 | Giessen et al. |
| 4,318,733 | A | 3/1982 | Ray et al. |
| 4,365,994 | A | 12/1982 | Ray |
| 4,415,530 | A | 11/1983 | Hunt |
| 4,419,130 | A | 12/1983 | Slaughter |
| 4,576,653 | A | 3/1986 | Ray |
| 4,596,282 | A | 6/1986 | Maddy et al. |
| 4,606,977 | A | 8/1986 | Dickson et al. |
| 4,635,701 | A | 1/1987 | Sare et al. |
| 4,638,847 | A | 1/1987 | Day |
| 4,639,576 | A | 1/1987 | Shoemaker et al. |
| 4,666,797 | A | 5/1987 | Newman et al. |
| 4,673,550 | A | 6/1987 | Dallaire et al. |
| 4,762,681 | A | 8/1988 | Tassen et al. |
| 4,803,045 | A | 2/1989 | Ohriner et al. |
| 4,806,394 | A | 2/1989 | Steine |
| 4,822,415 | A | 4/1989 | Dorfman et al. |
| 4,919,728 | A | 4/1990 | Kohl et al. |
| 4,943,488 | A | 7/1990 | Sung et al. |
| 4,957,982 | A | 9/1990 | Geddes |
| 4,981,644 | A | 1/1991 | Chang |
| 5,094,812 | A | 3/1992 | Dulmaine et al. |
| 5,252,149 | A | 10/1993 | Dolman |
| 5,280,726 | A | 1/1994 | Urbanic et al. |
| 5,306,358 | A | 4/1994 | Lai et al. |
| 5,375,759 | A | 12/1994 | Hiraishi et al. |
| 5,424,101 | A | 6/1995 | Atkins |
| 5,567,251 | A | 10/1996 | Peker et al. |
| 5,570,636 | A | 11/1996 | Lewis |
| 5,618,451 | A | 4/1997 | Ni |
| 5,820,939 | A | 10/1998 | Popoola et al. |
| 5,858,558 | A * | 1/1999 | Zhao .................... C22C 19/052 148/404 |
| 5,861,605 | A | 1/1999 | Ogawa et al. |
| 5,907,017 | A | 5/1999 | Ober et al. |
| 5,935,350 | A | 8/1999 | Raghu et al. |
| 5,942,289 | A | 8/1999 | Jackson |
| 5,988,302 | A | 11/1999 | Sreshta et al. |
| 6,117,493 | A | 9/2000 | North |
| 6,171,222 | B1 | 1/2001 | Lakeland et al. |
| 6,210,635 | B1 | 4/2001 | Jackson et al. |
| 6,232,000 | B1 | 5/2001 | Singh et al. |
| 6,238,843 | B1 | 5/2001 | Ray |
| 6,306,524 | B1 | 10/2001 | Spitsberg et al. |
| 6,326,582 | B1 | 12/2001 | North |
| 6,331,688 | B1 | 12/2001 | Hallén et al. |
| 6,332,936 | B1 | 12/2001 | Hajaligo et al. |
| 6,375,895 | B1 | 4/2002 | Daemen |
| 6,398,103 | B2 | 6/2002 | Hasz et al. |
| 6,441,334 | B1 | 8/2002 | Aida et al. |
| 6,582,126 | B2 | 6/2003 | North |
| 6,608,286 | B2 | 8/2003 | Jiang |
| 6,669,790 | B1 | 12/2003 | Gundlach et al. |
| 6,689,234 | B2 | 2/2004 | Branagan |
| 6,702,905 | B1 | 3/2004 | Qiao et al. |
| 6,702,906 | B2 | 3/2004 | Ogawa et al. |
| 6,750,430 | B2 | 6/2004 | Kelly |
| 7,052,561 | B2 | 5/2006 | Lu et al. |
| 7,219,727 | B2 | 5/2007 | Slack et al. |
| 7,285,151 | B2 | 10/2007 | Sjodin et al. |
| 7,361,411 | B2 | 4/2008 | Daemen et al. |
| 7,491,910 | B2 | 2/2009 | Kapoor et al. |
| 7,553,382 | B2 | 6/2009 | Branagan et al. |
| 7,569,286 | B2 | 8/2009 | Daemen et al. |
| 7,776,451 | B2 | 8/2010 | Jiang et al. |
| 7,935,198 | B2 | 5/2011 | Branagan et al. |
| 8,070,894 | B2 | 12/2011 | Branagan |
| 8,097,095 | B2 | 1/2012 | Branagan |
| 8,153,935 | B2 | 4/2012 | Jang et al. |
| 8,187,529 | B2 | 5/2012 | Powell |
| 8,187,725 | B2 | 5/2012 | Kiser et al. |
| 8,268,453 | B2 | 9/2012 | Dallaire |
| 8,474,541 | B2 | 7/2013 | Branagan et al. |
| 8,562,759 | B2 | 10/2013 | Cheney et al. |
| 8,562,760 | B2 | 10/2013 | Cheney et al. |
| 8,640,941 | B2 | 2/2014 | Cheney |
| 8,647,449 | B2 | 2/2014 | Cheney et al. |
| 8,658,934 | B2 | 2/2014 | Branagan et al. |
| 8,669,491 | B2 | 3/2014 | Menon et al. |
| 8,702,835 | B2 | 4/2014 | Yu et al. |
| 8,703,046 | B2 | 4/2014 | Hanejko et al. |
| 8,704,134 | B2 | 4/2014 | Branagan et al. |
| 8,777,090 | B2 | 7/2014 | Miller et al. |
| 8,801,872 | B2 | 8/2014 | Wright et al. |
| 8,808,471 | B2 | 8/2014 | Wright et al. |
| 8,858,675 | B2 | 10/2014 | Larsson |
| 8,870,997 | B2 | 10/2014 | Klekovkin et al. |
| 8,911,662 | B2 | 12/2014 | Larsson |
| 8,920,938 | B2 | 12/2014 | Hesse et al. |
| 8,973,806 | B2 | 3/2015 | Cheney |
| 8,992,659 | B2 | 3/2015 | Larsson et al. |
| 9,051,635 | B2 | 6/2015 | Jou |
| 9,095,932 | B2 | 8/2015 | Miller et al. |
| 9,145,598 | B2 | 9/2015 | Oshchepkov |
| 9,174,293 | B2 | 11/2015 | Meyer |
| 9,193,011 | B2 | 11/2015 | Mars et al. |
| 9,233,419 | B2 | 1/2016 | Gries |
| 9,255,309 | B2 | 2/2016 | Aimone |
| 9,309,585 | B2 | 4/2016 | Cheney et al. |
| 9,314,848 | B2 | 4/2016 | Larsson |
| 9,340,855 | B2 | 5/2016 | Schade et al. |
| 9,469,890 | B2 | 10/2016 | Bengtsson |
| 9,540,711 | B2 | 1/2017 | Fifield |
| 9,580,773 | B2 | 2/2017 | Aimone et al. |
| 9,725,793 | B2 | 8/2017 | Aimone et al. |
| 9,738,959 | B2 | 8/2017 | Cheney et al. |
| 9,802,387 | B2 | 10/2017 | Cheney |
| 9,821,372 | B2 | 11/2017 | Gries |
| 9,834,829 | B1 | 12/2017 | Aimone et al. |
| 9,845,520 | B2 | 12/2017 | Wright et al. |

(56) References Cited

U.S. PATENT DOCUMENTS

| | | | |
|---|---|---|---|
| 9,856,546 B2 | 1/2018 | Fischer et al. |
| 9,879,333 B2 | 1/2018 | Gerk et al. |
| 9,908,816 B2 | 3/2018 | Champion et al. |
| 9,914,987 B2 | 3/2018 | Snyder et al. |
| 9,951,413 B2 | 4/2018 | Billieres |
| 9,957,592 B2 | 5/2018 | Aimone et al. |
| 10,100,388 B2 | 10/2018 | Cheney |
| 10,105,796 B2 | 10/2018 | Eibl |
| 10,125,412 B2 | 11/2018 | Kaner et al. |
| 10,173,290 B2 | 1/2019 | Cheney |
| 2001/0019781 A1 | 9/2001 | Hasz |
| 2002/0054972 A1 | 5/2002 | Charpentier et al. |
| 2002/0098298 A1 | 7/2002 | Bolton et al. |
| 2002/0148533 A1 | 10/2002 | Kim et al. |
| 2002/0159914 A1 | 10/2002 | Yeh |
| 2004/0001966 A1 | 1/2004 | Subramanian |
| 2004/0062677 A1 | 4/2004 | Chabenat et al. |
| 2004/0079742 A1 | 4/2004 | Kelly |
| 2004/0115086 A1 | 6/2004 | Chabenat et al. |
| 2004/0206726 A1 | 10/2004 | Daemen et al. |
| 2005/0047952 A1 | 3/2005 | Coleman |
| 2005/0109431 A1 | 5/2005 | Kernan et al. |
| 2006/0063020 A1 | 3/2006 | Barbezat |
| 2006/0093752 A1 | 5/2006 | Darolia et al. |
| 2006/0163217 A1 | 7/2006 | Jiang |
| 2006/0191606 A1 | 8/2006 | Ogawa et al. |
| 2006/0260583 A1 | 11/2006 | Abi-Akar et al. |
| 2007/0026159 A1 | 2/2007 | Deem |
| 2007/0029295 A1 | 2/2007 | Branagan |
| 2007/0090167 A1 | 4/2007 | Arjakine et al. |
| 2007/0187369 A1 | 8/2007 | Menon et al. |
| 2007/0253856 A1 | 11/2007 | Vecchio et al. |
| 2007/0284018 A1 | 12/2007 | Hamano et al. |
| 2008/0001115 A1 | 1/2008 | Qiao et al. |
| 2008/0031769 A1 | 2/2008 | Yeh |
| 2008/0149397 A1 | 6/2008 | Overstreet |
| 2008/0241580 A1 | 10/2008 | Kiser et al. |
| 2008/0241584 A1 | 10/2008 | Daemen et al. |
| 2009/0017328 A1 | 1/2009 | Katoh et al. |
| 2009/0075057 A1 | 3/2009 | Kulkarni |
| 2009/0123765 A1 | 5/2009 | Branagan |
| 2009/0252636 A1 | 10/2009 | Christopherson, Jr. et al. |
| 2009/0258250 A1 | 10/2009 | Daemen et al. |
| 2009/0285715 A1 | 11/2009 | Arjakine et al. |
| 2010/0009089 A1 | 1/2010 | Junod et al. |
| 2010/0028706 A1* | 2/2010 | Hornschu ............. C23C 28/321 |
| | | 428/577 |
| 2010/0044348 A1 | 2/2010 | Buchmann |
| 2010/0047622 A1 | 2/2010 | Fischer et al. |
| 2010/0055495 A1 | 3/2010 | Sjodin |
| 2010/0101780 A1 | 4/2010 | Ballew et al. |
| 2010/0132408 A1 | 6/2010 | Billieres |
| 2010/0136361 A1 | 6/2010 | Osuki et al. |
| 2010/0155236 A1 | 6/2010 | Lee et al. |
| 2010/0159136 A1* | 6/2010 | Lee ..................... C23C 10/16 |
| | | 427/255.39 |
| 2010/0166594 A1 | 7/2010 | Hirata et al. |
| 2010/0189588 A1 | 7/2010 | Kawatsu et al. |
| 2010/0192476 A1 | 8/2010 | Theisen et al. |
| 2010/0258217 A1 | 10/2010 | Kuehmann |
| 2011/0004069 A1 | 1/2011 | Ochs et al. |
| 2011/0031222 A1 | 2/2011 | Branagan et al. |
| 2011/0048587 A1 | 3/2011 | Vecchio et al. |
| 2011/0064963 A1 | 3/2011 | Cheney et al. |
| 2011/0139761 A1 | 6/2011 | Sugahara et al. |
| 2011/0142713 A1 | 6/2011 | Kawasaki et al. |
| 2011/0162612 A1 | 7/2011 | Qiao et al. |
| 2011/0171485 A1 | 7/2011 | Kawamoto et al. |
| 2011/0220415 A1 | 9/2011 | Jin et al. |
| 2012/0055903 A1 | 3/2012 | Izutani et al. |
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0288400 A1 | 11/2012 | Hirata et al. |
| 2013/0039800 A1 | 2/2013 | Dolman |
| 2013/0094900 A1 | 4/2013 | Folkmann et al. |
| 2013/0108502 A1 | 5/2013 | Bei |
| 2013/0167965 A1 | 7/2013 | Cheney et al. |
| 2013/0171367 A1 | 7/2013 | Kusinski et al. |
| 2013/0174612 A1 | 7/2013 | Linnot et al. |
| 2013/0216722 A1 | 8/2013 | Kusinski et al. |
| 2013/0224516 A1 | 8/2013 | Kusinski et al. |
| 2013/0266798 A1 | 10/2013 | Cheney |
| 2013/0266820 A1 | 10/2013 | Kusinski et al. |
| 2013/0294962 A1 | 11/2013 | Wallin et al. |
| 2014/0044617 A1 | 2/2014 | Dreisinger |
| 2014/0116575 A1 | 5/2014 | Cheney et al. |
| 2014/0219859 A1 | 8/2014 | Cheney |
| 2014/0234154 A1 | 8/2014 | Cheney et al. |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0106035 A1 | 4/2015 | Vecchio et al. |
| 2015/0275341 A1 | 10/2015 | Cheney |
| 2015/0284817 A1 | 10/2015 | Snyder et al. |
| 2015/0284829 A1 | 10/2015 | Cheney |
| 2015/0354036 A1 | 12/2015 | Cheney |
| 2015/0367454 A1 | 12/2015 | Cheney |
| 2016/0017463 A1 | 1/2016 | Cheney |
| 2016/0024621 A1 | 1/2016 | Cheney |
| 2016/0024624 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0168670 A1 | 6/2016 | Cheney |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0258044 A1 | 9/2016 | Litström et al. |
| 2016/0289803 A1 | 10/2016 | Cheney |
| 2016/0376686 A1 | 12/2016 | Jou |
| 2017/0014865 A1 | 1/2017 | Kusinski et al. |
| 2017/0067138 A1 | 3/2017 | Vecchio et al. |
| 2017/0130311 A1 | 5/2017 | Cheney |
| 2017/0275748 A1 | 9/2017 | Cheney et al. |
| 2018/0066345 A1 | 3/2018 | Cheney et al. |
| 2018/0094343 A1 | 4/2018 | Gerk et al. |
| 2018/0135143 A1 | 5/2018 | Snyder et al. |
| 2019/0017154 A1 | 1/2019 | Kaner et al. |

FOREIGN PATENT DOCUMENTS

| | | |
|---|---|---|
| CN | 1225629 C | 11/2005 |
| CN | 101016603 | 8/2007 |
| CN | 102233490 A | 11/2011 |
| CN | 102357750 A | 2/2012 |
| CN | 102686762 | 3/2014 |
| CN | 104838032 | 8/2015 |
| CN | 103635284 | 3/2017 |
| CN | 104039483 | 3/2017 |
| DE | 27 54 437 | 7/1979 |
| DE | 33 20 513 | 12/1983 |
| DE | 42 02 828 | 8/1993 |
| DE | 10 320 397 A1 | 12/2004 |
| EP | 0 346 293 | 12/1989 |
| EP | 0 365 884 | 5/1990 |
| EP | 0 774 528 | 5/1997 |
| EP | 1 270 755 | 1/2003 |
| EP | 1 338 663 | 8/2003 |
| EP | 2 305 415 | 8/2003 |
| EP | 1 857 204 | 11/2007 |
| EP | 2 050 533 | 4/2009 |
| EP | 2 388 345 | 11/2011 |
| EP | 2 660 342 | 11/2013 |
| EP | 2 072 627 | 4/2014 |
| EP | 2 730 355 | 5/2014 |
| EP | 2 743 361 | 6/2014 |
| EP | 2 104 753 | 7/2014 |
| EP | 2 778 247 | 9/2014 |
| EP | 2 563 942 | 10/2015 |
| EP | 2 064 359 | 4/2016 |

(56) References Cited

FOREIGN PATENT DOCUMENTS

| | | |
|---|---|---|
| EP | 2 235 225 | 10/2016 |
| EP | 2 659 014 | 4/2017 |
| EP | 2 147 445 | 5/2017 |
| EP | 2 252 419 | 6/2017 |
| EP | 2 265 559 | 6/2017 |
| EP | 2 329 507 | 6/2017 |
| EP | 2 285 996 | 8/2017 |
| EP | 1 700 319 | 10/2017 |
| EP | 2 101 940 | 11/2017 |
| EP | 2 207 907 | 12/2017 |
| EP | 2 414 554 B1 | 2/2018 |
| EP | 2 432 908 B1 | 5/2018 |
| EP | 2 181 199 | 8/2018 |
| EP | 2 477 784 | 8/2018 |
| EP | 1 799 380 | 9/2018 |
| EP | 2 066 822 | 9/2018 |
| EP | 3 034 637 B1 | 10/2018 |
| EP | 3 266 892 | 10/2018 |
| FR | 2055735 | 4/1971 |
| FR | 2218797 | 9/1974 |
| GB | 956740 | 4/1964 |
| GB | 1073621 | 6/1967 |
| GB | 2153846 A | 8/1985 |
| IN | MUMNP-2003-00842 | 4/2005 |
| JP | 58-132393 | 8/1983 |
| JP | 60-031897 | 7/1985 |
| JP | 60-133996 | 7/1985 |
| JP | 63-026205 | 2/1988 |
| JP | 63-42357 | 2/1988 |
| JP | 63-65056 | 3/1988 |
| JP | 03-133593 | 6/1991 |
| JP | 04-358046 | 12/1992 |
| JP | 09-95755 | 4/1997 |
| JP | 2005-290406 | 10/2005 |
| JP | 2012-000616 | 1/2012 |
| KR | 10-0935816 B1 | 1/2010 |
| TW | 200806801 A | 2/2008 |
| WO | WO 84/000385 | 2/1984 |
| WO | WO 84/004760 | 12/1984 |
| WO | WO 95/004628 | 2/1995 |
| WO | WO 03/018856 | 3/2003 |
| WO | WO 06/086350 | 8/2006 |
| WO | WO 08/011448 | 5/2008 |
| WO | WO 08/082353 | 7/2008 |
| WO | WO 08/153499 | 12/2008 |
| WO | WO 09/085000 | 7/2009 |
| WO | WO 10/044740 | 4/2010 |
| WO | WO 10/046224 | 4/2010 |
| WO | WO 10/074634 | 7/2010 |
| WO | WO 10/134886 | 11/2010 |
| WO | WO 11/005403 | 1/2011 |
| WO | WO 11/021751 | 2/2011 |
| WO | WO 11/071054 | 6/2011 |
| WO | WO 11/084213 | 7/2011 |
| WO | WO 11/152774 | 12/2011 |
| WO | WO 11/158706 | 12/2011 |
| WO | WO 12/021186 | 2/2012 |
| WO | WO 12/022874 | 2/2012 |
| WO | WO 12/112844 | 8/2012 |
| WO | WO 12/162226 | 11/2012 |
| WO | WO 13/049056 | 4/2013 |
| WO | WO 13/055652 | 4/2013 |
| WO | WO 13/060839 | 5/2013 |
| WO | WO 13/126134 | 8/2013 |
| WO | WO 13/152306 | 10/2013 |

OTHER PUBLICATIONS

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.
Cheney, et al.: "Development of quaternary Fe-based bulk metallic glasses," Materials Science and Engineering, vol. 492, No. 1-2, Sep. 25, 2008, pp. 230-235.
Cheney: Modeling the Glass Forming Ability of Metals. A Dissertation submitted in partial satisfaction of the Requirements for the degree of Doctor of Philosophy. University of California, San Diego. Dec. 2007.
Cr—C Phase Diagram [online], [retrieved on Jan. 27, 2015]. Retrieved from the Internet: http://www.azom.com/work/3ud2quvLOU9g4VBMjVEh_files/image002.gif.
Davis, Jr, ed. Dec. 1994, Stainless steels. ASM International, Materials Park, OH, p. 447.
Iron-Carbon (Fe—C) Phase diagram [online], [retrieved on Jan. 27, 2014]. Retrieved from the internet: <URL:http://www.calphad.com/iron-carbon.html>.
Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.
Miracle, D.B.: The efficient cluster packing model—An atomic structural model for metallic glasses, Acta Materialia vol. 54, Issue 16, Sep. 2006, pp. 4317-4336.
Mo—C Phase Diagram [online], [retrieved on Jan. 27, 2015]. Retrieved from the Internet: <URL:http://factsage.cn/fact/documentation/SGTE/C-Mo.jpg.
Nb—C Phase Diagram [online], [retrieved on Jan. 27, 2015]. Retrieved from the Internet: <URL:http://www.crct.polymtl.ca/fact/documentation/BINARY/C-Nb.jpg.
Tillack, et al.: "Selection of Nickel, Nickel-Copper, Nickel-Cromium, and Nickel-Chromium-Iron Allows", ASM Handbook, Welding, Brazing and Soldering, vol. 6,Dec. 1, 1993 (Dec. 1, 1993) pp. 586-592, XP008097120, p. 589.
Titanium-Boron (TiB) Phase Diagram [online], [retrieved on Jan. 27, 2015]. Retrieved from the internet<URL:http://www.calphad.com/titaniumboron.html>.
Yoo et al., Jun. 2006, The effect of boron on the wear behavior of iron-based hardfacing alloys for nuclear power plants valves, Journal of Nuclear Materials, 352:90-96.
International Search Report and Written Opinion re PCT Application No. PCT/US2012/070398, dated Apr. 23, 2013.
Al-Aqeeli et al.: "Formation of an amorphous phase and its crystallization in the immiscible Nb—Zr system by mechanical alloying," Journal of Applied Physics 114, 153512, 2013.
Azo Materials, "Stainless Steel—Grade 420," Oct. 23, 2001, <https://www.azom.com/article.aspx?ArticleID=972>, accessed Aug. 15, 2017.
Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.
Conversion Chart of Vickers Hardness (HV) to Rockwell C (HCR).
Ohmura, Dec. 2003, Evaluation of temper softening behavior of Fe—C binary martensitic steels by nanoindentation, Scripta Materialia, 49(12):1157-1162.
Senkov et al., Jun. 23, 2010, Refractory high-entropy alloys, Intermetaliics, 18:1758-1765.
Teng: "Processing, Microstructures, and Properties of Aluminide-Strengthened Ferritic Steels," The University of Tennessee, Knoxville, Dec. 2011.
Wank et al., 2007, Behavior of thermally sprayed wear protective coatings exposed to different abrasive wear conditions in comparison to hard chromium platings, 7 pp.

\* cited by examiner

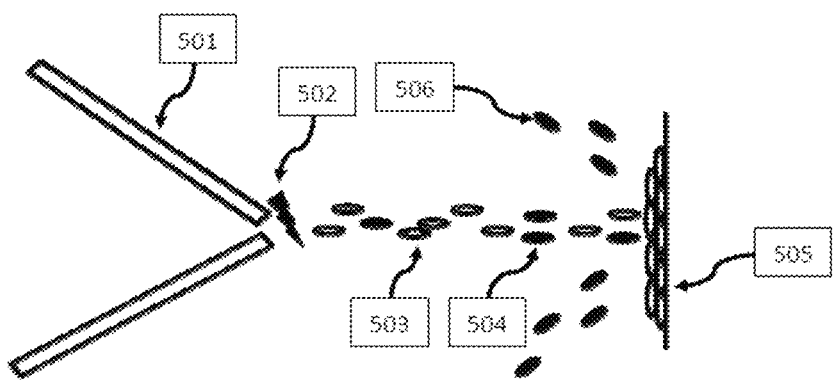
FIGURE 1
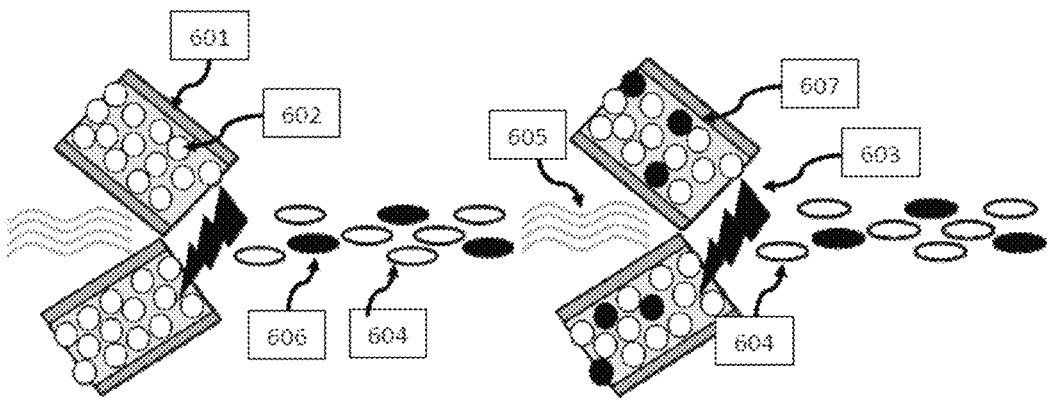
FIGURE 2A                    FIGURE 2B
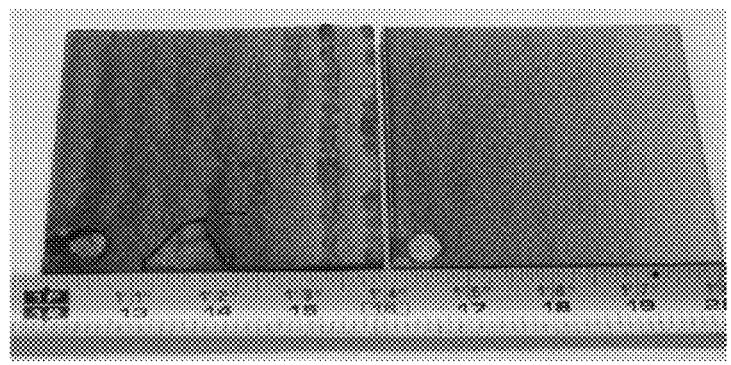
FIGURE 3

COATING COMPOSITIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The invention relates generally to a corrosion resistant coating, applications employing the coating, and method to form the coating.

BACKGROUND

Corrosion is a known problem in a number of industries. In the oil and gas industry (O&G) alone, corrosion costs US refineries over $4 billion annually. Periodically depositing a corrosion resistant surface onto existing equipment is generally an economical method for protecting metallic components in aggressive environments, e.g., corrosive environments containing strong acids such as sulfuric acid, or bases at elevated temperatures. The coating is typically deposited using a thermal spray process. The technique is commonly used to protect refinery vessels, power generation equipment, chemical processing baths, and other large scale industrial surfaces.

In coatings made by a thermal spray process such as twin wire arc spray (TWAS), elemental components particularly the powdered species of the cored wire can oxidize ("in-flight particle oxidation"). Oxidation of the atomized molten thermal spray material is undesirable for several reasons, including: a) selective oxidation of alloying elements such as chromium, which reduces the corrosion performance of the deposited coating; b) the oxides embedded within the coating are not effective at sealing porosity in service; and c) high oxide content generally decreases both the adhesion of the coating to the substrate and the inter-particle adhesion. TWAS coatings generally contain a high degree of porosity in the range of 5%-10%, and oxide content in the range of 5-10%. Such a high level of porosity inevitably leads to what is termed "through-porosity" or "inter-connected porosity," meaning the coating is permeable to corrosive media leading to corrosion attacks regardless of the inherent corrosion performance of the thermal spray coating alloy. Additionally, corrosive media trapped in small pores can result in aggressive localized attack. As such, it is desirable to reduce the oxide content in thermal spray coatings.

There are a number of references disclosing thermal spray coating compositions. U.S. Pat. No. 4,561,892 discloses the use of a powder alloy of specific composition used in the plasma thermal spray process to deposit a corrosion resistant coating. U.S. Pat. No. 5,120,614 discloses a Ni—Cr-refractory type alloy to resist high temperature oxidation and acid attack suitable for use as bulk or weld overlay materials. U.S. Pat. No. 4,027,367 discloses nickel-aluminum alloy compositions for arc spray applications, forming a self-bonding coating. U.S. Pat. Nos. 4,453,976; 4,529,616, and 5,326,645 disclose powder alloys for use in thermal spray and flame spray applications. U.S. Pat. Nos. 2,875,042 and 7,157,151 disclose compositions for use in spray and fuse technique to form coatings.

There is still a need for coatings with improved characteristics in as-sprayed condition. There is also a need for improved methods to apply coatings, particularly for coating large surface areas on-site. The invention relates to improved compositions for thermal spray techniques, providing coatings with low porosity/oxide content.

SUMMARY

Embodiments of the invention provide compositions that, and feedstocks having compositions that, exhibit an austenitic nickel microstructure when alloyed. The compositions comprise Ni, Cr, Mo and at least one element selected from the group consisting of Al, Si, and Ti. The feedstock may be in the form of a cored wire or wires, a solid wire or wires, or a powder.

BRIEF DESCRIPTION OF THE DRAWING

FIG. 1 is a diagram showing the self-grit blasting effect in one TWAS embodiment.

FIG. 2A is a diagram showing an embodiment of TWAS coating using a metallic wire feedstock, forming grit blasting particles.

FIG. 2B is a diagram showing an embodiment of TWAS coating using a wire feedstock, forming grit blasting particles.

FIG. 3 is a scanning electron micrograph (SEM) comparing two thermal spray coatings samples, one coated with the prior art Alloy C276 and one coated with an embodiment of the inventive coating.

DESCRIPTION

Figure 4:
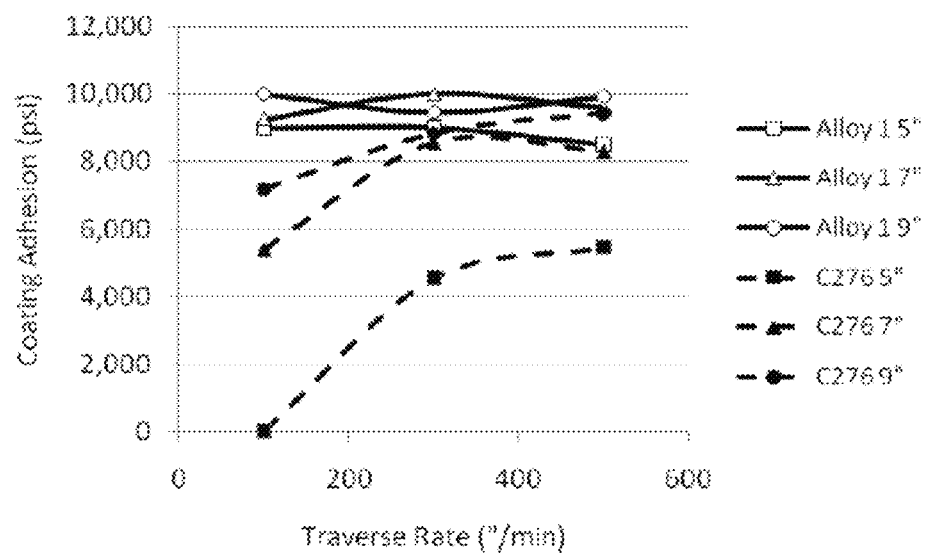
FIG. 4 is a graph comparing coating adhesion of the prior art Alloy C276 and an embodiment of the invention under a variety of spray distances and traverse rates.

The following terms will be used throughout the specification and will have the following meanings unless otherwise indicated.

A "layer" is a thickness of a material that may serve a functional purpose including but not limited to erosion resistance, reduced coefficient of friction, high stiffness, or mechanical support for overlying layers or protection of underlying layers.

"Coating" is comprised of one or more adjacent layers and any included interfaces. Coating also refers to a layer is placed directly on the substrate of the article to be protected. In another embodiment, "coating" refers to the top protective layer.

"Refractory elements" refers to Cr, V, Nb, Mo, and W, metals that are resistant to heat and wear, with a higher melting temperature than steel.

"Single component coating" refers to coating formed with a single feedstock material whether the feedstock is in the form of a wire or a powder, this is opposed to a multi-component (or two-component) coating formed by two or more distinct alloys (in the form of a wire or powder), or by the brazing of two different materials forming a coating.

"Substrate" refers to a portion or the entire surface an article, e.g., a work piece, equipment or portions of an equipment to be protected by a coating of the embodiment. The article to be coated can be of any shape, e.g., tools, the interior of a structural component such as a pipe, a vessel, or a tank.

"Non-ideal conditions" in the context of thermal spraying refers to spraying on-site by hand over large surface areas and deviating from optimal spraying conditions (e.g., consistent traverse rate, consistent coating thickness, exact spray distance and perfect 90° angle to the substrate), as it is not possible for a human operator to steadily hold a 15 lb. gun and maintain exacting coating parameters for eight hours while traversing thousands of square feet.

"Impurity content" is defined as the sum of the porosity and oxide content volume fraction in a coating.

"Gettering elements" refer to metals such as aluminum, titanium, and silicon that react preferentially with the oxygen and nitrogen in the steel.

"Interface" refers to the initial layer between the coating layer and the substrate layer, wherein subsequently a transition region is formed between the coating layer and the substrate with one or more constituent material composition and/or property value changes from 5% to 95% of the initial values that characterize each of the adjacent layers.

In one aspect, the invention relates to a method for forming a protective coating on an equipment for use in a corrosive environment. The method comprises: preparing a substrate on the equipment to be coated; applying a coating layer comprising a NiCrMoX alloy onto the substrate to be coated, X contains at least two gettering elements selected from Al, Si, Ti in an amount of 5-20 wt. %; wherein the coating layer formed by the alloy has an impurity content of less than 15%, a corrosion rate of less than 150 mpy measured according to ASTM G31, and an adhesion strength of at least 9,000 psi measured according to ASTM D4541. In one embodiment, the coating is applied by thermal spraying a cored wire formed with a sheet having an alloy composition of NiCrMo rolled into a tubular form rolled into a tubular form containing X as a powder contained within the tubular form as the core, wherein X contains Al and Si as gettering elements, and wherein the gettering elements have at least a 30% decrease in deposition efficiency for Al and at least a 20% decrease in deposition efficiency for Si.

In another aspect, the method comprises: preparing a substrate on the equipment to be coated; applying onto a substrate a coating layer using thermal spray coating with a wire feedstock comprising a nickel alloy composition containing in weight %: Cr: 12%-25%; Mo: 8%-15%; and at least two gettering elements selected from Al: 0.25-12%, Si: up to 10%, and Ti: up to 5%; balance of Ni and unavoidable impurities; wherein the coating layer formed by the nickel alloy composition has an impurity content of less than 15%, a corrosion rate of less than 150 mpy measured according to ASTM G31, and an adhesion strength of at least 9,000 psi measured according to ASTM D4541.

In yet another aspect, the invention relates to a method for forming a protective coating on an equipment for use in a corrosive environment. The method comprises: applying onto at least a surface on the equipment a coating layer using thermal spray coating with a wire feedstock having components of NiCrMoX, wherein the Ni—Cr—Mo components form an alloy sheath rolled into a tubular form, wherein the X component contains Al and at least one of two gettering elements Si and Ti and forms a powder contained within the tubular form as the core, wherein the powder is in an amount of 5-20 wt. % based on total weight of the wire feedstock; wherein at least 10% of the gettering elements form hard oxide particles which do not adhere to the surface of the equipment and function to grit blast the surface for the coating layer formed to have an adhesion strength of at least 9,000 psi measured according to ASTM D4541. In one embodiment, the method is for periodic coating of equipment selected from the group of recovery boilers, furnace tubes, metal sheets, panels, pressure vessels, separator vessels, drums, rail cars, heat exchangers, pipes, heat exchanger parts, storage tanks, valves, chamber enclosure wall, substrate support, gas delivery system and components, and gas exhaust system and components.

In one aspect, the invention relates to a work piece having a protective coating on at least a surface. The work piece comprises: a metal surface onto which a coating is applied by thermal spraying a wire comprising a NiCrMoX alloy, wherein X contains at least two gettering elements selected from Al, Si, Ti in an amount of 5-20 wt. %; wherein the coating has as an impurity content of less than 15%, a corrosion rate of less than 150 mpy measured according to ASTM G31, and an adhesion strength of at least 9,000 psi measured according to ASTM D4541.

In yet another aspect, the work piece comprises: a metal surface onto which a coating is applied by thermal spraying a wire feedstock comprising a nickel alloy in weight %: Cr: 12%-25%; Mo: 8%-15%; and at least two gettering elements selected from Al: 0.25-12%, Si: up to 10%, and Ti: up to 5%; balance of Ni and unavoidable impurities; wherein the coating has an impurity content of less than 15%, a corrosion rate of less than 150 mpy measured according to ASTM G31, and an adhesion strength of at least 9,000 psi measured according to ASTM D4541. In one embodiment, the coating is applied to repair at least a portion of the metal surface on the work piece.

In one embodiment, the invention relates to compositions that form high bond strength low permeability coatings for corrosion protection, and methods for depositing such coatings including thermal spray processes such as high velocity continuous combustion, plasma spray, flame spray, high velocity oxyfuel, arc jet, arc spray, and twin wire arc spray (TWAS).

Alloy Compositions:

The alloy composition is a Ni—Cr alloy or a Ni—Cr—Mo alloy, capable of forming an austenitic nickel coating. In one embodiment, the alloy composition has at least 75% volume fraction in the form of austenitic nickel phase structure. The composition in the form of NiCrMoX or NiCrX, with a sufficient amount of oxide gettering elements X to prevent the oxide attack of corrosion resistant alloying elements such as chromium or molybdenum, and reduce overall embedded oxide content. Furthermore, the composition is controlled such that the alloy has a low melting temperature and behaves in a more fluid matter during deposition, resulting in a lower coating porosity and higher adhesion. X contains at least two of Al, Si, and Ti. In one embodiment, the alloy composition is in the form or a cored wire formed via a Ni—Cr alloy filled with a blend of powder alloy to produce the desired Al, Si, and Ti content, which is formed as a sheath rolled in a tubular form with powder alloy components within ("cored wire"). For some applications to produce high bond strength low permeability corrosion resistant coatings, the composition can be employed as a powder feedstock or solid wire.

In one embodiment, the alloy has a composition in weight %: 12-25% Cr; 8-15% Mo; two or more gettering elements selected from Al, Si, and Ti in an amount of up to 12% each with a total concentration of 5-25%; balance of Ni and unavoidable impurities. In one embodiment, the total concentration of gettering elements is between 5-20% with each component concentration of less than 10%. In another embodiment, the total concentration of gettering elements is between 5-10% with each component concentration of less than 7%.

In another embodiment, the alloy has a composition of 20% Cr, less than 13% Mo, less than 6 Si, less than 0.25% Ti, less than 2% Al, and a balance of Ni. In a further embodiment, the alloy excludes B except for unavoidable impurities.

In another embodiment, the alloy has the composition of: Ni: balance; Al: up to 12%, Cr: 12%-25%, Mo: 8%-15%, Si: up 10%, Ti: up to 5%. In one embodiment, the amount of Al and Si is at least 0.25% each. In yet another embodiment, the alloy has a composition of any of:

Alloy 1: Ni: bal, Al: 1.85, Cr: 20.0, Mo: 10.4, Si: 6.21, Ti: 0.16;

Alloy 2: Ni: bal, Al: 2.73, Cr: 20.4, Mo: 8.64, Si: 4.83, Ti: 0.67;

Alloy 3: Ni: bal, Al: 1.5, Cr: 20.0, Mo: 12.7, Si: 5.98, Ti: 0.15; and

Alloy 4: Ni: bal, Al: 3, Cr: 20.0, Mo: 12.7, Si: 5.98, Ti: 1.0.

The inventive alloy composition is designed using computational metallurgical techniques for an alloy having a high chromium (e.g., ~>20%), high molybdenum (e.g., ~>10%) concentration for a reduced liquidus temperature (<1500° K or <1227° C., or <2240° F.). Additional considerations include but are not limited to an inherent exothermic reaction, which occurs when the cored wire components are alloyed together and with the addition of nickel and aluminum. This reaction increases the overall heat input into the system, for a high energy splat which more effectively bonds the coating to the substrate.

Additional design criteria include the selective formation of hard particles during the spray process, with controlled amounts of oxide gettering elements such as aluminum, silicon, and titanium. The selected components have the effect of preferentially forming high temperature oxides ("grit blasting components") and low electronegativity values (lower than the base metal and other desired deposition elements) on the Pauling scale, which is ideal in creating a grit blasting effect. The oxide particles with high melting temperatures tend not to attach the coating during spray, but affect the metallic species of the existing coating through plastic deformation for increased adhesion strength.

Examples of the grit blasting particles in thermal sprayed coatings include but are not limited to oxides, nitrides, carbo-nitrides, carbides and complexes thereof of Al, Ti, Si, including but not limited to silicon aluminum oxide, titanium silicon oxide, etc. (collectively referred to as "hard oxide particles"). Chromium oxide does make an effective grit blasting component. However, the formation of chromium oxide is generally undesirable due to the depletion of chromium in the metallic component of the coating, which will typically decrease corrosion performance. While some of the hard oxide particles do become embedded in the coating, a portion simply bounce off the coating surface after the initial contact, for a thermal sprayed coating with at least 10% less oxide gettering elements in metal or metal oxide form as compared to the original concentration of the gettering elements in the wire feedstock. In a second embodiment, the coating has at least 20% less Al (as metal or aluminum oxide) as compared to the amount of Al originally in the wire feedstock. With the grit blasting effect of the hard oxides bouncing off and not attached to the surface, the particles cause additional plastic deformation in the metallic species of the coating, thereby roughening the surface, relieving thermal and tensile stresses, increasing bond strength, and decreasing porosity.

In the coating formed by the alloy composition of the invention, oxides of Al, Ti and Si preferentially form compared to oxides of Cr, Mo, and Ni, as indicated by the relatively high content of Al, Si, and Ti in the oxide chemistry of the coating compared to the low content in the feedstock wire. In one embodiment, the ratio of aluminum oxide to aluminum in the coating is at least 5:1. In another embodiment, the ratio is at least 10:1. On the other hand, the ratio of chromium oxide to chromium in one embodiment is at most 4:1 in one embodiment and 3:1 in a second embodiment.

In the form of a coating, the grit blasting particles in the alloy composition have average particle sizes ranging from 1 to 50 μm in one embodiment; 5 to 30 μm in a second embodiment; and 8 to 25 μm in a third embodiment. The grit blasting components have a concentration ranging from 5 to 25% of the total un-deposited material in one embodiment; 8 to 15% in a second embodiment; about 10% in a third embodiment; and from 20-25% in a fourth embodiment.

Due to the grit-blasting effect, the total deposition efficiency of the gettering elements such as aluminum, silicon, and titanium in coating applications is less than 70% in one embodiment; less than 60% in a second embodiment; and less than 50% in a third embodiment. Generally, prior art twin wire arc spray materials have 70% deposit efficiency. In one embodiment, the thermal spraying results in at least a 30% decrease in the deposition of metallic aluminum and at least a 20% decrease in the deposition efficiency of metallic silicon. Deposit efficiency is computed as the ratio of weight of materials deposited as coating to weight of feed materials.

In one embodiment in the form of a cast ingot, the alloy composition has multi-phase structure per examination of the microstructures via X-ray diffraction (XRD). The two-phase microstructure of the cast ingot, as measured via energy dispersive spectroscopy, shows hard molybdenum silicide particles in a nickel matrix depleted of molybdenum content. Such a microstructure is vulnerable to corrosive attack due the nickel matrix being depleted in molybdenum. In one embodiment in the form of a coating, the alloy composition has a single phase austenite structure. The elimination of the molybdenum silicide particles in the thermal spray coating is an indication that oxide forming elements such as Si and Al preferentially react with oxygen when travel from the spray gun to the substrate.

Reference will be made to the figures to further illustrate the grit blasting effect of the alloy compositions. FIG. 1 is a diagram showing twin wire arc spraying of an embodiment of the alloy composition with a self-grit blasting effect. The grit blasting components can be inserted into the wire during manufacture (as cored wire) or forms in suit during the spray process. In either case, the thermal spray feedstock material (501) passes through the arc (502) to form a thermal spray plume composed of metallic (503) and grit blasting components (504). As this spray plume impinges upon a substrate, the metallic particles will preferentially stick, resulting in a primarily metallic coating (505); the oxide grit blasting particles will preferentially bounce off the substrate as non-attaching grit blasting particles (506). Although a fraction of these oxides will become embedded into the coating, most will bounce off the substrate as grit blasting components. The non-attaching grit blasting particles beneficially affect the metallic coating by inducing plastic deformation, surface roughness, relieving stresses and collapsing pores. Thermal spray coatings are formed in this fashion are characterized as having higher adhesion, lower permeability, and reduced effective corrosion rates.

In one embodiment as illustrated in FIG. 2A, the grit blasting components are selectively formed as sprayed. As shown, metallic tubular wire (601) is carrying a blend of powder (602) void of any grit blasting components. As the cored wire travels through the arc (603), a portion of the powder (602) reacts with the environment and air stream used to propel the molten metal, forming a grit blasting particle or component (606) during the spray process. The metallic particles (604) are left free to form a denser, more adherent, more corrosion resistant coating.

In another embodiment as illustrated in FIG. 2B, the oxide gettering components (607) are inserted into the cored wire as a fraction of the total powder component, or as the entirety of the powder component of a cored wire (not shown). This is intended to be used when the grit blasting effect is to be maximized. As in the as-sprayed formation process, the metallic sheath (601) also contains metallic particles (602) which are heated across the arc (603) and propelled towards the coating surface as metallic droplets (604) via the atomizing gas (605). A certain portion of the atomized thermal spray particles become oxidized and either act as additional grit blasting components or become embedded in the coating (not shown).

Applications:

The alloy composition, as cored wire, solid wire, or powder feedstock, is suitable for use in coating applications including but not limited to thermal spray or welding. In one embodiment, the composition is a cored wire formed via a Ni or Ni—Cr alloy, filled with a blend of powder alloy components used to produce the alloy content with Mo and gettering elements such as Al, Ti, and Si. In another embodiment, the composition is in the form of powder feedstock or solid wire in order for a high bond strength, low permeability corrosion resistant coatings.

The alloy composition can be applied in one application as a single layer, or as a plurality of layers forming a coating. The alloy composition is applied as coating layer on a substrate (equipment or work piece) with a thickness of at least 4 mils (0.10 mm) in one embodiment; from 10 to 50 mils in a second embodiment (0.254 mm-1.27 mm); and from 20 to 100 mils in a third embodiment (0.508 mm-2.54 mm).

The coating can be used in any new manufacturing and remanufacturing applications requiring a protective coating. The coating can also be used for sealing of a work piece (used interchangeably with "equipment") as well as for wear and corrosion resistant applications on a work piece. In one embodiment, the composition is for coating equipment used in corrosive environments in energy, health and environmental, oil and gas, pharmaceutical and flue gas desulfurization. The composition is particularly suitable for coating equipment with frequent exposure to acetic, sulfuric, hydrochloric, hydrofluoric, and carbonic acids, molten sulfur, NaOH, $H_2S$, $CO_2$, ammonia, wet chloride gas, hypochlorite and chlorine dioxide solutions, e.g., pharmaceutical reaction vessels, process chambers, pressure vessels for use in the chemical industry and oil and gas industry such as refineries. The substrate of the work piece or the equipment to be coated can be a portion of the equipment exposed to the corrosive environment, or a portion of the equipment that has to be repaired/coated, or the coating can be applied to the entire surface of the equipment.

In one embodiment, the composition is for periodic coating and/or repairing equipment for use in harsh corrosive environments including but not limited to recovery boilers, furnace tubes, metal sheets, panels, pressure vessels, separator vessels, drums, rail cars, heat exchangers, pipes, heat exchanger parts, storage tanks, valves, chamber enclosure wall, substrate support, gas delivery system and components, gas exhaust system and components, etc.

In one embodiment, the alloy is for coating mechanical components for use in severe corrosion along with wear and erosion exposure such as downhole gas production. The coating can also be used to protect equipment from further corrosion, e.g., after general corrosion and the formation of pits on interior surface exposed to corrosive attacks. In one embodiment, the coating is used to repair the overlay in a pressure vessel after the cracks are ground out of the overlay for the coating to stay in place and protect the underlying base metal. In another embodiment, the coating is applied on packing areas of reformer stem valves, repairing liquid sulfur rail cars with localized attack. In yet another embodiment, the coating is applied onto heat-affected zones of head seam weld and impingement areas near process stream inlets in condenser heads.

The substrate of the equipment to be coated with the alloy composition can be constructed of iron, nickel, cobalt, or copper based alloy. In one embodiment, it is welded galvanized steel. In one embodiment prior to thermal spraying to form a coating, the substrate surface is given a cleaning to remove all diffusion barriers such as paint, coatings, dirt, debris, and hydrocarbons to a state known as white metal. In another embodiment, the surface is given an anchor profile abrasive blast ranging from 0.5 mils (0.0254 mm) to 6 mils (0.1524 mm) to provide initial anchor profile for the thermal sprayed coating to better mechanically bond to the substrate.

The coating can be applied on the substrate using any of conventionally sprayed combustion, arc, plasma, HVAF (high velocity air fuel), or HVOF (high velocity oxygen fuel) techniques. In one embodiment, the coating can be applied by hand (without gun motion control devices) or via an automatic gun, using any of high velocity continuous combustion, plasma spray, flame spray, high velocity oxyfuel, arc jet, arc spray, and twin wire arc spray.

In one embodiment, the coating is applied using the twin wire arc spraying (TWAS) process. In a TWAS process, a thermal sprayer comprises two consumable electrodes that are shaped and angled to allow an electric arc to form in an arcing zone there-between, as shown in FIG. 1. The consumable electrodes may comprise twin wires formed from the alloy composition, which wires are angled to allow an electric discharge to form. An electric arc discharge is generated between the electrodes when a voltage is applied to the electrodes while a carrier gas is flowed between the electrodes. Arcing between the electrodes atomizes and at least partially liquefies the metal on the electrodes and carrier gas energized by the arcing electrodes propels the molten particles out of the thermal sprayer and towards the substrate surface, where they cool and condense to form a coating.

In one embodiment of a TWAS process, the particles are subject to temperatures from 1650° C. to 2760° C. (3000° F. to 5000° F.), and then atomized and propelled towards the substrate via a high pressure (~600 Pa or ~90 psi) air stream. In another embodiment, the coating is formed with a spray gun having a power supply between 150-250 Amps and 25-35 Volts and varying thermal spray parameters including: spray distance of 5-10"; coating thickness of 0.5-60 mils; spray angle of 30-90°; traverse rate of 100-1000 inches/min; and thickness per pass ranging from 1-20 mils.

Properties:

In one embodiment, the alloy composition forms a lower porosity coating with reduced or minimal permeability due to the low inherent melting temperature of the alloy, the exothermic reaction between Ni and Al, and the in-situ forming of hard oxide grit during spray. In one embodiment, the alloy composition forms a thermal sprayed coating characterized with an impurity content of less than 15%. In another embodiment, the coating has an impurity content of less than 12%. In a third embodiment, an impurity content of less than 10%. In one embodiment, the impurity content is measured in a coating thermal sprayed at a wide range of spray angles of 30 to 90° and coating thickness ranging from 15 mils to 60 mils. In yet another embodiment, the coating has an impurity content of less than 8% for coatings when thermal sprayed at an optimal 90° angle.

The low impurity content provides a coating with low permeability characteristics and inherently excellent corrosion resistant properties of less than 150 mpy (mils per year) corrosion rate in embodiment, measured according to ASTM G31. The corrosion test is conducted in 350° F. sulfuric acid at 83% concentration for two weeks. The corrosion rate is less than 125 mpy in a second embodiment, and less than 100 mpy in a third embodiment.

In one embodiment with the grit blasting effect, the alloy composition forms a thermal sprayed coating having adhesion strength of at least 7000 psi (48 MPa) measured according to any of ASTM D4541 and ASTM D7234. Adhesion strength herein refers to the average adhesion strength from different locations across the coating surface. In another embodiment, the adhesion strength ranges from 55-70 MPa (8,000-10,000 psi). In one embodiment, a thermal sprayed coating has an adhesion strength of at least 10,000 psi (48 MPa).

The thermal sprayed coating in one embodiment is further characterized as having a relatively constant adhesion strength, with an adhesion strength variation of less than 25% for spray angle variations of ±60° (from 90°). Spray angle variations are typically expected when there is a need to spray in a tight surface or when spraying uneven surfaces. 90° is the optimal condition when spraying flat surfaces. In one embodiment, the adhesion strength is at least 7000 psi (48 MPa) when sprayed at a spray angle of 30°-90°.

The coating is also characterized as having a relatively constant adhesive strength even with varying traverse rate and spray distance, with adhesion strength variations of less than 25% across the coating surface for traverse rate variations of ±600 inches/min. In one embodiment, the adhesion strength is at least 7000 psi (48 MPa) for a traverse spraying rate in the range of 100-200 inches/min.

The coating is further characterized as not impacted by spalling. It is known that the worst, although relatively common, form of failure for thermal spray coatings is the spalling of the mechanically bound coating from the substrate and leaving the substrate material entirely exposed. Spalling can occur for several reasons: impact, erosive stresses, thermal stress, and corrosive underpinning, among others. When not applied properly, the coating can immediately spall from the substrate during the spray process. With strong adhesion to the substrate, the high integrity coating formed with the alloy composition is expected to have much longer lifetime than coatings of the prior art even when spraying is done under non-ideal conditions.

EXAMPLES

The following illustrative examples are intended to be non-limiting.

In the examples, a solid wire with a prior art composition Hastalloy™ C276 composition and a cored wire (Alloy 1) were used with compositions as shown in wt. %.

C276:

Ni (bal), Co (0-2.5), Mn (0.35), Si (0.01), Cr (14.5-16.5), Fe (4-7); Mo (15-17); W (3-4.5);

Alloy 1:

Ni (bal), Al (1.85), Cr (20), Mo (10.4), Si (6.21), Ti (0.16).

The secondary alloying components in C276 (Co, W, Fe, W, Si, and Mn) have the effect on properties relevant to a bulk form such as ease of fabrication, microstructure of wrought forms, etc. In Alloy 1, the secondary alloying components in affect the spray-ability and performance of the material under the arc spray process, with elevated chromium content to account for the preferential in-flight oxidation of chromium during the spray process, and elevated silicon concentration to improve corrosion resistant properties. The as-deposited metallic component of the Alloy 1 coating is expected to closely resemble the chromium and molybdenum levels found in wrought alloy C276.

Coatings were deposited on substrates via robot using similar parameters, 200 amps, 32 volts, 85 psi gas pressure, green air cap, short cross positioned, TAFA spray gun, CP 302 power supply, 100"/min traverse rate, 5" spray distance, 90° spray angle, and 20 mil coating thickness. FIG. 3 is a micrograph comparing the Alloy C276 coating with the Alloy 1 coating. As shown, spalling or danger of spalling is seen in the Alloy C276 coating.

Additional thermal sprayed coatings were carried out via robot using robot (ideal conditions) and by hand (non-ideal conditions), using both the TWAS and HVAS (high velocity arc spray) techniques. Hand spraying was to simulate the non-ideal conditions.

Adhesion Strength Tests:

The results showed that Alloy 1 formed coatings with 8,000 to 10,000 psi bond strengths on a 3.5 mil profile surface in all test conditions, ideal or non-ideal, measured according to ASTM D4541/ASTM D7234. Alloy C276 formed coatings with greater than 8,000 psi adhesion strength coatings under ideal conditions, with a sharp drop-off in adhesion strength to 2,000 psi or less in some cases under non-ideal conditions. FIG. 4 compares the coating adhesion strengths of Alloy 276 and Alloy1 under a variety of spray distances (5", 7", and 9") and traverse rates (100"/min, 300"/min, and 500"/min).

In different tests at various coating thicknesses, Alloy 1 also shows consistent high adhesion strength results as sprayed at a variety of angles and coating thickness levels, with values being averaged from at least 3 adhesion tests:

TABLE 1

| Thickness | 30° angle | 45° angle | 90° angle |
| --- | --- | --- | --- |
| 0.015" | 7,580 psi | 9,263 psi | 9,247 psi |
| 0.023" | 7,931 psi | 6,659 psi | 7,373 psi |
| 0.060" | 8,251 psi | 9,473 psi | 10,000* |

*indicates glue failure occurred with no coating separation from substrate.

Adhesion Variations Under Different Spraying Conditions:

Additional tests were conducted to evaluate the coatings under different parameters, including ideals and non-ideal spray conditions. The ideal spray conditions include: 7" spray distance, 700"/min traverse rate, and a 90° spray angle. Smaller (5") and larger spray distances (9") were used to study the parameter range an operator might oscillate between when hand spraying a vessel. Although 700"/min is determined to be an ideal rate, it is relatively fast for an applicator to hand spray large surface areas for a long period of time. Thus, slower traverse rates were included to simulate realistic conditions including the possibility of applicator fatigue. Spray angle parameters were varied from 90°, the optimal condition, to 30°, a non-optimal condition which can occur even when spraying flat surfaces, but will certainly occur when the need to spray in tight spaces arises. The results in Table 2 show that Alloy 1 coatings display consistent high adhesion strength results.

TABLE 2

| Alloy | Traverse rate | Spray distance | Angle | Thickness per pass | Surface T ° F. | Adhesion psi | Mode* |
| --- | --- | --- | --- | --- | --- | --- | --- |
| 1 | 100 | 5 | 90 | 10 | 290 | 8,976 | C |
| 1 | 300 | 5 | 90 | 10 | 200 | 9,000 | C |
| 1 | 500 | 5 | 90 | 5 | 150 | >8,500* | G, 15% C |
| 1 | 700 | 5 | 90 | 3 | 100 | 10,000 | A |
| 1 | 100 | 7 | 90 | 16 | 200 | 9,250 | C |
| 1 | 300 | 7 | 90 | 5 | 150 | >10,000* | G, 10% C |
| 1 | 500 | 7 | 90 | 4 | 150 | 9,588 | C, 10% G |
| 1 | 100 | 9 | 90 | 20 | 250 | >10,000* | G, 10% C |
| 1 | 300 | 9 | 90 | 7 | 150 | 9.458* | G, 10% C |
| 1 | 500 | 9 | 90 | 4.2 | 150 | 9,924 | C, 10% G |
| 1 | 300 | 7 | 30 | 6 | 150 | >10,000* | G |
| 1 | 500 | 7 | 30 | 4 | 150 | >10,000* | G |
| C276 | 100 | 5 | 90 | 10 | 400 | 0 | N/A |
| C276 | 300 | 5 | 90 | 6 | 375 | 4,540 | A |
| C276 | 500 | 5 | 90 | 5 | 350 | 5,460 | A |
| C276 | 700 | 5 | 90 | 3 | 250 | 6,100 | A |
| C276 | 100 | 7 | 90 | 16 | 230 | 5,392 | A |
| C276 | 300 | 7 | 90 | 6.5 | 230 | 7,928 | A |
| C276 | 500 | 7 | 90 | 3.5 | 190 | 8,736 | A |
| C276 | 100 | 9 | 90 | 18 | 250 | 7,184 | A |
| C276 | 300 | 9 | 90 | 6.5 | 220 | 8,820 | A |
| C276 | 500 | 9 | 90 | 4 | 200 | 9,420 | A |
| C276 | 300 | 7 | 30 | 6 | 220 | 8,567 | A |
| C276 | 500 | 7 | 30 | 4 | 200 | 4,733 | C |

*Mode of coating failure is defined as A: adhesive; C: cohesive; G: glue failure.
Secondary failure mode indicated as a percentage of affected surface area.

Slower traverse rates and smaller coating distances typically result in fast material build up rate and result in lower coating adhesion as shown with lowered coating adhesion in Alloy C276 coatings. In the worst case scenarios, Alloy 276 coatings appear to be in danger of spalling off when traverse rates fell near 100"/min. On the other hand, Alloy 1 did not show the adverse effect of traverse rate and/or spray distance, and maintained a relatively constant adhesion strength of >8000 psi with the changing parameters.

Figure 5:
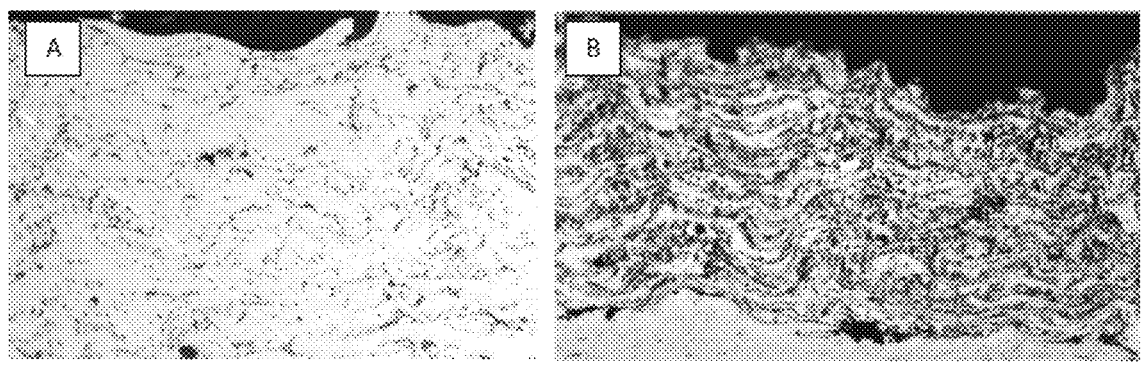
FIG. 5 contains micrographs at 100×, comparing 25-30 mil thermal spray coatings of the prior art Alloy C276 and an embodiment of the invention, sprayed via similar parameters using TWAS.

Impurity/Oxide Contents Evaluation:

In addition to excellent adhesion strength, further analyses showed non-permeable nature of Alloy 1 as compared to the prior art Alloy C276. FIG. 5 are micrographs comparing 25-30 mil thermal spray coatings at 100× made with Alloy 1 (A) and Alloy C276 (B). Dark spots within the thermal spray coatings are indications of either porosity or oxides, both of which are deleterious to alloy performance. As shown, Alloy 1 has much less porosity and oxides than alloy C276. Image analysis software was used to calculate the porosity and oxide content in both coatings. It is common for thermal spray coatings in the prior art to have an impurity concentration (porosity+oxide content) in the range of 20% as with alloy C276. The impurity concentration often further increases as the optimal spray conditions are not maintained, such as a variance in spray angle.

In the experiments, it was found that spraying alloy C276 at decreasing angles results in increased impurity content, up to 35%, whereas Alloy 1 impurity content is relatively stable at below 10% for the wide range of spray angles 30°-90°. The higher degree of spray consistency is uncommon amongst TWAS coatings and highly desirable for reliable performance Table 3 compares porosity and oxide content in both coatings at different TWAS spray angles as computed using image analysis software:

TABLE 3

| Alloy | Angle | Porosity/Oxides |
| --- | --- | --- |
| Alloy 1 | 30° | 7.3 |
| Alloy 1 | 60° | 9.6 |
| Alloy 1 | 90° | 6.5 |
| Alloy C276 | 30° | 23.5 |
| Alloy C276 | 60° | 27.9 |
| Alloy C276 | 90° | 23.5 |

Figure 6:
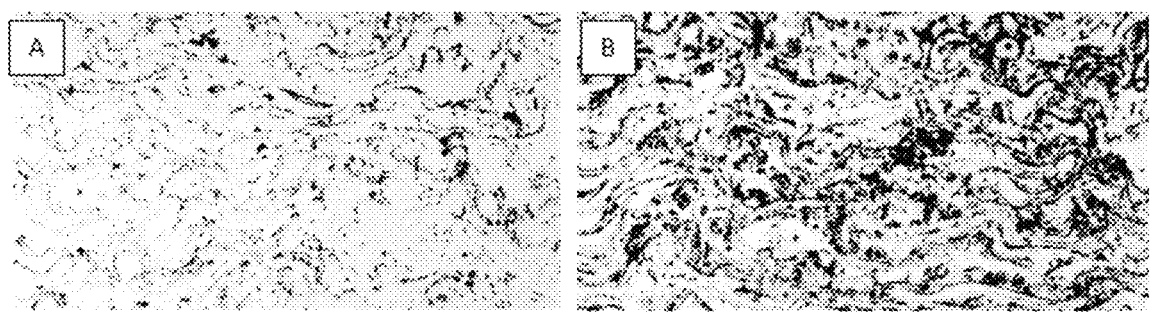
FIG. 6 compare the microstructures of the prior art Alloy C276 coating vs. an embodiment of the invention, using image analysis software to show impurity content.

Image analysis software was further employed in FIG. 6 to show the non-permeable nature of Alloy 1. The micrograph indicates that it is unlikely for the impurities in the coating to form a connected path from the substrate to the surface in Alloy 1 ("A") thus preventing permeability. This is in sharp contrast to the Alloy C276 micrograph ("B") with a plurality of connected paths.

Oxide Vs. Metal Contents:

In further analyses using energy dispersive spectroscopy (EDS) to study the formation of elemental oxide, it is believed that the reduced embedded oxide content in the final coating structure is the result of the aluminum, titanium, and silicon powder species selectively forming hard oxide particles during the spray process. As shown in the scanning electron micrograph (SEM) of Alloy 1 as in FIG. 7, EDS spectrum acquisition points show the presence of both oxide species (201) and metallic species (202). However, in FIG. 8, it is shown that oxides which are embedded into the coating structure of Alloy 1 contain much higher concentrations of silicon, aluminum, and titanium than the metallic component of the coating.

Figure 8:
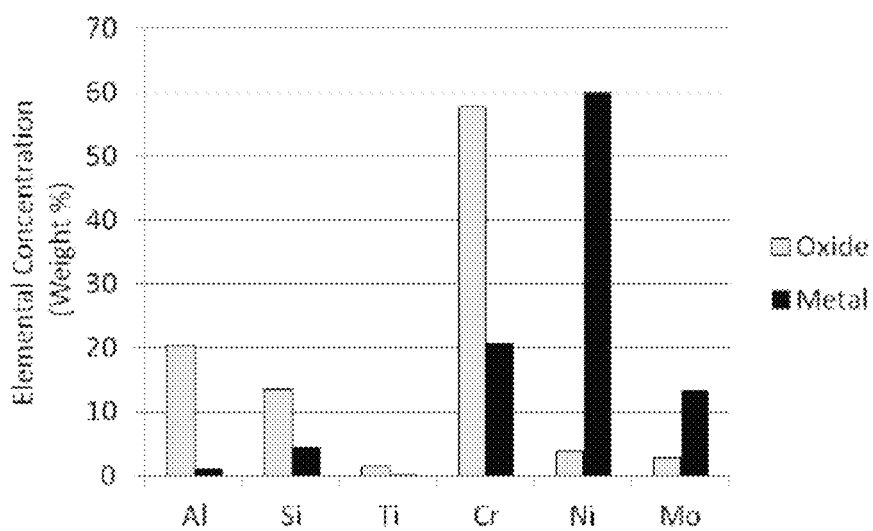
FIG. 8 is a graph comparing the alloy content in oxide and metal species within thermal spray coating structure of the coating embodiment in FIG. 7.

As shown in FIG. 8, chromium oxide also selectively forms, but the relatively high aluminum content in the oxide chemistry compared to the low aluminum content in the feedstock wire (>20% versus 1.5%) shows that aluminum oxide is preferentially forming during the process. Chromium oxide does make an effective grit blasting component. However, the formation of chromium oxide is generally undesirable due to the depletion of chromium in the metallic component of the coating, which will typically decrease corrosion performance.

Further analysis through SEM shows that the grit blasting components, as indicated by the embedded grit blast particles in Alloy 1 take on the form of oxides of Al, Ti, Si, Cr, and other more complex forms of (Al, Si, Ti, Cr)-rich oxides with particle sizes ranging from 5 to 25 μm. While a portion of the oxides in Alloy 1 do become embedded, the majority are not viscous enough to cling to the thermal spray coating surface and simply bounce off the surface after initial contact. This phenomenon is evident by the reduced oxide content in Alloy 1 (<10%) as compared to Alloy C276 (>20%) despite the use of highly oxidizing elements in Alloy 1. The bombardment with hard oxides that do not attach to the surface is beneficial to the final coating performance in that they cause additional plastic deformation in the metallic species of the coating, thereby roughening the surface, relieving thermal and tensile stresses, increasing bond strength, and decreasing porosity.

Figure 9:
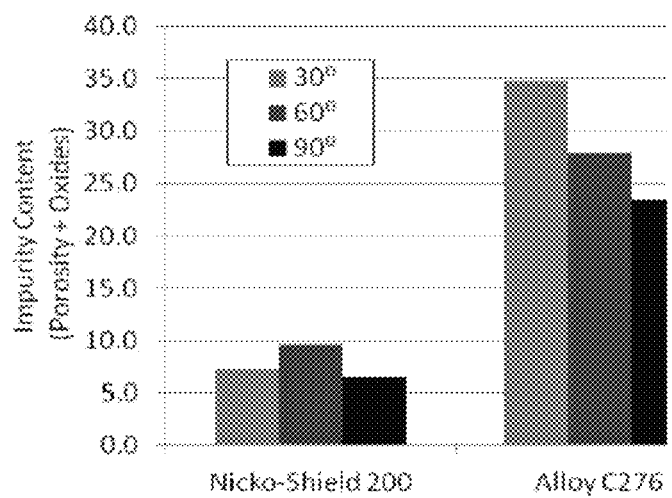
FIG. 9 is a graph comparing the wire feedstock chemistry and chemistry of metallic phase within a coating embodiment of the invention.

FIG. 9 illustrates the reduced deposition efficiency by comparing the thermal spray wire feedstock chemistry of Alloy 1, with the actual composition of the metallic portion of the coating. As shown, the actual amount of metallic Al, Si, and Ti within the coating is reduced from its original chemistry in the wire, with a drop of about 37% for Al and 22% Si, which beneficially results in a slightly increased alloy content of Cr and Mo in the coating and subsequently the overall corrosion resistant rate of the coating.

Corrosion Evaluation:

Corrosion measurements were conducted to evaluate the corrosion rate of Alloy 1 coating vs. Alloy C276 coating. The corrosion tests were carried out with coupons coated with Alloy 1 and Alloy C276 in 350° F. (~180° C.) dilute (83%) $H_2SO_4$, simulating an environment often experienced in oil refining, chemical processing, among other industries. Bulk Alloy 276 has a reported rate of 200 mpy and low carbon steel has a reported rate of >4000 mpy under these conditions.

The corrosion rate of Alloy 1 remained steady at 80-90 mpy over two weeks of exposure. Alloy C276 experienced an increased corrosion rate from 90 mpy after Week 1 to 150 mpy after Week 2, a 66% increase. Both coatings saw measureable thickness loss as a result of the exposure, with 4-8 mils for Alloy 1 and 5-8 mils for Alloy C276. The Alloy C276 coating was noticeably smoother after exposure than the exposed Alloy 1 Coupon.

The adhesion of each coating was tested on the exposed area. However, glue adhesion was insufficient to create coating failures in either material. Each surface was lightly blasted with AlO to remove any scale formed during the exposure. The Alloy C276 saw glue failure at around 1,000 psi, likely due to the smoothed contour of the corroded surface. The Alloy 1 coating saw glue failure at 5,000 to 6,000 psi, indicating that it is unlikely that the acid had penetrated the coating thickness to attack the substrate/coating interface directly.

A possible explanation for the ability of the Alloy 1 coating to maintain a stabilized corrosion rate and a high level of coating adhesion after corrosive exposure is the 'scale clogging' effect. Reducing oxide concentration is a factor in reducing permeability in corrosive conditions, and allows a coating containing some level of porosity (such as a thermal spray coating) to form a completely impermeable surface. Corrosive conditions such as sulfuric acid lead to the formation of protective oxides on the surfaces of metallic particles within the coating structure. This scale prevents further corrosion on the surface, but also serves to clog porosity in the coating structure and prevent further ingress of corrosion species. Oxides embedded during the spray process may or may not be susceptible to corrosion themselves, but cannot effectively generate scale. Thus, corrosive media can more easily travel between oxide boundaries than between metal boundaries due to the 'scale clogging' effect.

Visual Observations:

Experiments were repeated using the twin wire arc spray process using different brands of equipment under non-ideal conditions confirmed that Alloy 1 consistently has high coating integrity compared to Alloy C276 (where this difference can be seen with the naked eye).

In a further embodiment, the invention relates to brazing methods in which no joining is used, wherein a single-component braze material is melted and flows across the surface of the substrate forming a protective coating. As in a typical brazing technique, a strong metallurgical bond is created between the substrate and the coating created by the brazing composition. In another embodiment, the coating formed by the mechanically bound coating alloy is disclosed with a sufficiently low heat treatment operation to minimize damage the substrate in any manner. The coating as formed with the alloy composition of the invention is characterized as being fully protective of the substrate, exhibit minimal or no through-porosity or dilution, providing the work piece with corrosive and/or erosive resistant characteristics.

Brazing Alloy Compositions:

The brazing alloy composition is designed using computational metallurgical techniques for forming a protective coating characterized as having a melting point that is sufficiently below the melting temperature of a typical substrate to be protected, e.g., mild steel or carbon steel with a melting point Tm of 2600-2800° F. Additional considerations include a sufficient amount of at least two alloying components characterized as corrosion resistant, e.g., refractory elements such as Cr, V, Nb, Mo and W which have melting temperatures in descending order of: Tm(W)=6192° F.>Tm(Mo)=4753° F.>Tm(Nb)=4491° F.>Tm(V)=3479° F.>Tm(Cr)=3375° F.>Tm(Fe)=2800° F. and Tm(carbon steel)=2600-2800° F. In one embodiment, the alloy composition has a Tm in the range of 2140-2240° F.

In one embodiment, the brazing alloy composition contains at least two refractory elements selected from Cr, V, Nb, Mo and W each in an amount of up to 30% each and a total concentration of up to 40%. In another embodiment, the brazing alloy has a composition in weight %: 10-30% Cr and at least a refractory element selected from V, Nb, Mo and W in an amount of up to 20% each; balance of Fe and unavoidable impurities.

Refractory elements have been identified as key elements to reducing the corrosion rate, specifically the sulphidation rate, of iron alloys. However, silicon and aluminum have also been demonstrated as elements which can significantly improve sulfur related corrosion performance. In one embodiment, the brazing alloy composition further contains at least one of Al and Si, in an amount of up to 10% each.

In one embodiment, the brazing alloy composition is a steel alloy having a plurality of components as defined in weight percent as: Fe (55-65%), Cr (0-30%), R (4-30%), Si (0-10%), B (0-3%), and Al (0-20%), with R is at least a refractory element selected from V, Mo, Nb, and W. In another embodiment, the brazing alloy composition comprises any of the following chemistries, given in weight percent:

Brazing alloy 1: Fe—60.8%, Cr—22.1%, Mo—9.5%, Si—3.6%, B—2.8%, Al—1.1%;
Brazing alloy 2: Fe—60.8%, Cr—22.1%, Nb—4.8%, V—4.8%, Si—3.6%, B—2.8%, Al—1.1%;
Brazing alloy 3: Fe—56.8%, Cr—21.6%, Mo—12.8%, Si—5.6%, B—2.2%, Al—1.1%;
Brazing alloy 4: Fe—61.7%, Cr—12%, Nb—5%, V—5%, Si—3.6%, B—2.75%, Al—10%;
Brazing alloy 5: Fe—61.7%, Cr—17%, Nb—5%, V—5%, Si—3.6%, B—2.75%, Al—5%;
Brazing alloy 6: Fe—65.9%, Cr—24.6%, Mo—4.6%, Si—1.5%, Mn—1.2%, B—2.2%;
Brazing alloy 7: Fe—65.9%, Cr—24.6%, V—4.6%, Si—1.5%, Mn—1.2%, B—2.2%.

Figure 10:
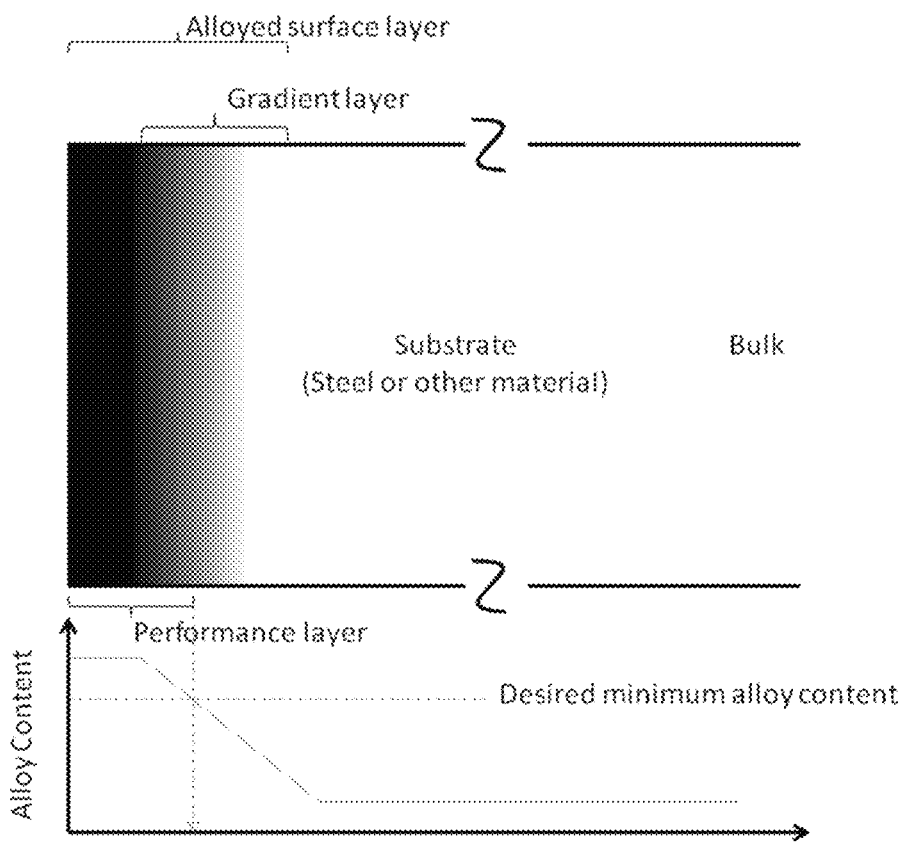
FIG. 10 is a diagram illustrating the composition gradient across the thickness of a substrate coated with one embodiment of a brazing alloy composition.

After coating and heat treatment, the brazing alloy composition forms a coating layer with a composition gradient across the thickness of the coating as illustrated in FIG. 10, which compositional gradient can act to reduce stresses during thermal cycling and/or add composition control of the coating layer to protect the underlying substrate. In the figure, grayscale contrast is used to depict the level of alloying (black=high, white=none) at various distances reaching from the surface into the bulk of the brazing alloy.

As illustrated in FIG. 10, the brazing alloy composition in the bulk of the coating is relatively high and constant in the exterior layer of the coating (the black region on the far left of the diagram). This layer is defined as the coating layer. The shading illustrates the gradient profile beneath the interface, with a drop in the concentration further away from the interface as illustrated by a change in the shading from dark gray to lighter gray then white. As the corrosion performance of the substrate is dictated by the level of alloying, at some distance from the coating interface, the concentration of the alloy elements reaches a point wherein it is no longer satisfactory for corrosion performance. This layer is defined as the performance layer as indicated in the FIG. 1.

In one embodiment, the performance layer is at a distance of at least 10 μm from the interface and with an average concentration of refractory elements of at least 25% of the concentration of refractory elements in the coating layer (as formed by the brazing alloy composition). In another embodiment, the performance layer is at least 20 μm from the interface of the substrate and the coating layer. In a third embodiment, the performance layer is at least 50 μm from the interface layer.

In one embodiment, the depth of the performance layer as well as the concentration of the refractory elements alloyed into the substrate (after the heat treatment step) can be effectively controlled. Additionally, the specific elements that diffuse into the substrate as well as the elements or phases in the gradient layer can also be controlled, as smaller elements, i.e., Fe, Cr, V, etc. can more easily diffuse into the substrate leaving behind relatively larger refractories (i.e., W, Nb, Mo). The larger refractory elements in one embodiment form thermally insulating phases such as carbides, borides, silicides, or oxides to provide enhanced corrosion resistance through refractory enrichment in the matrix of the gradient layer adjacent to the interface.

In one embodiment, the relatively large refractory (i.e., W, Nb, Mo) content in the coating layer increases at least 5% due to the selective diffusion of smaller elements over the interface and into the substrate during the heat treatment operation. In another embodiment the relatively larger refractory content increases by at least 10%. In a third embodiment, the relatively large refractory content increases by at least 30%.

Methods to Form Coatings: The brazing alloy composition, as cored wire, solid wire, or powder feedstock, can be applied onto the substrate of the equipment (work piece) using a variety of methods including but not limited to welding, kinetic spray, physical vapor deposition (PVD), chemical vapor deposition (CVD), and thermal spray. The brazing alloy can be applied as a single layer, or as a plurality of layers, with a total thickness of 0.5 to 150 mils (12.7-3810 μm) in one embodiment; from 1 to 100 mils (254-2540 μm) in a second embodiment; and from 5 to 50 mils (127-1270 μm) in a third embodiment.

The substrate to be coated with the brazing alloy composition can be constructed of iron, nickel, cobalt, or copper based alloy. In one embodiment, it is carbon (mild) steel. In one embodiment prior to the deposition of the coating, the substrate surface is given a cleaning to remove all diffusion barriers such as paint, coatings, dirt, debris, and hydrocarbons. In another embodiment, the surface is given an anchor profile abrasive blast ranging from 0.5 mils (0.0254 mm) to 6 mils (0.1524 mm) to provide initial profile for the thermal sprayed coating to better mechanically bond to the substrate.

In one embodiment, the brazing alloy composition is deposited via the thermal spray technique, which allows for quick a quick application (e.g., 25 lbs/hr or more) of a thick coating of material onto the substrate in a controlled and measurable manner. The thermal spray coating can be any of conventionally sprayed flame, arc wire, plasma, or HVOF (high velocity oxy fuel) techniques.

In the heat treatment step, a sufficient amount of heat is applied to melt the brazing alloy composition for a coating with a thickness substantially close to the original thickness. In one embodiment, the equipment with the brazing alloy coating is heat treated in a commercial vacuum furnace. In another embodiment, the heat treatment can be local using techniques including but not limited to induction heating, combustion burner, electric resistance heaters, etc. The heat treatment ranges from 10-60 minutes in one embodiment, and from 15 to 45 minutes in a second embodiment, wherein the brazing alloy is fused onto the base metal substrate and for the brazing alloy flow across the substrate surface, eliminating coating porosity and the possibility of uncoated exposed surfaces. In one embodiment, the heat treatment is via induction heating due to its rapid and controllable heat treatment potential, melting the brazing alloy composition to form a fully protective layer at temperatures below the melting temperature of the substrate.

Figure 12:
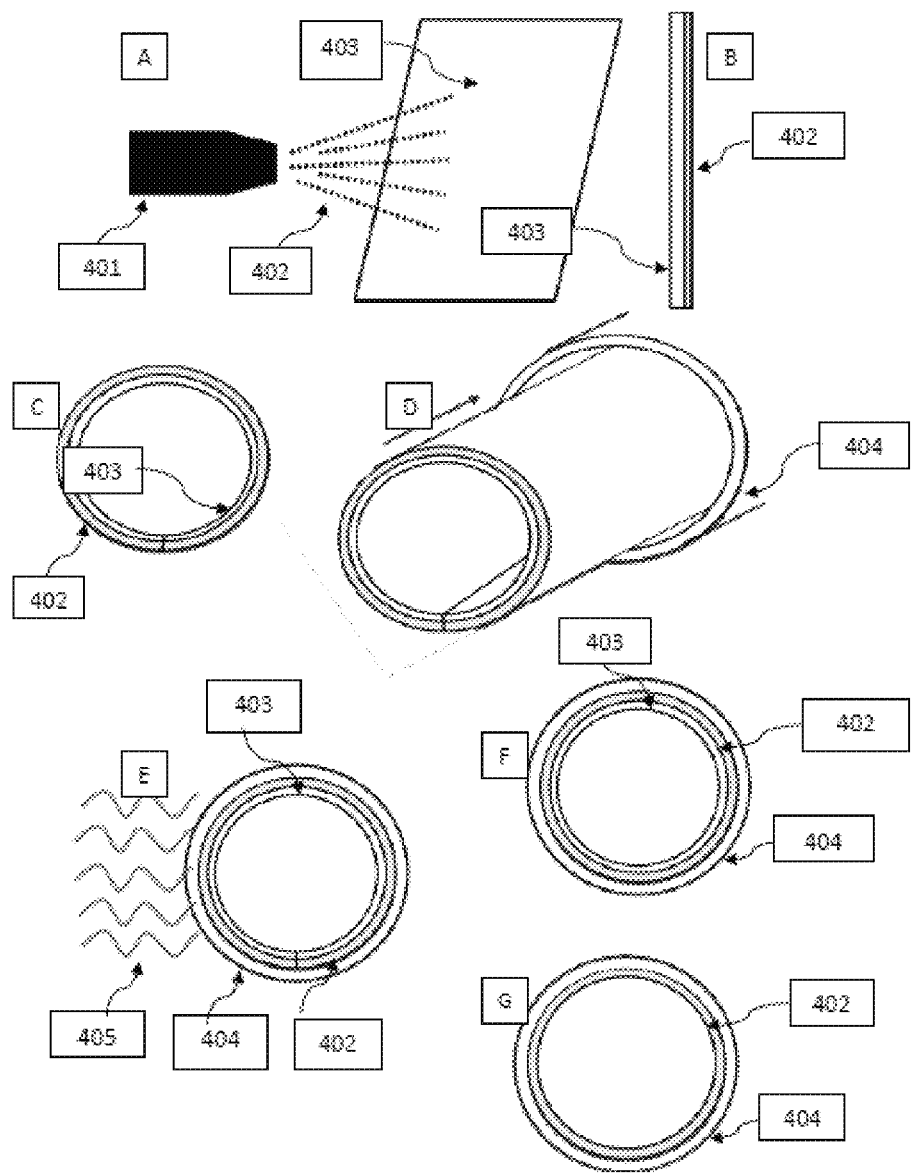
FIG. 12 is a diagram illustrating an embodiment of a method for coating a work piece with the use of a carrier sheet.

In one embodiment to provide coating protection for interior of tubes or tubing, e.g., having relatively small diameters (6" or below) and that are relatively long (10' or above), an apparatus scheme as illustrated in FIG. 12 is employed. As shown, a steel tubing 901 is fed into position on top of a moving conveyer or rollers 903, for its interior to by coated (throughout its length) in the spray zone by spray assembly 905. The mechanical assembly in one embodiment has one or more spray guns 906 connected to the assembly, which may be stationary or rotating, spraying the coating alloy 907 onto the interior surface of the tubing. The mechanical assembly traverses along the length of the tubing via an arm assembly 902 to spray the entire interior length of the tubing. Control of the mechanical assembly can be separate from the spray guns 906 in a containerized spray booth 904. The heat treatment operation takes place at one end of the pipe using techniques known in the art, e.g., induction coil 908, causing the brazed coating to fuse onto the substrate forming a protective layer.

Figure 11:
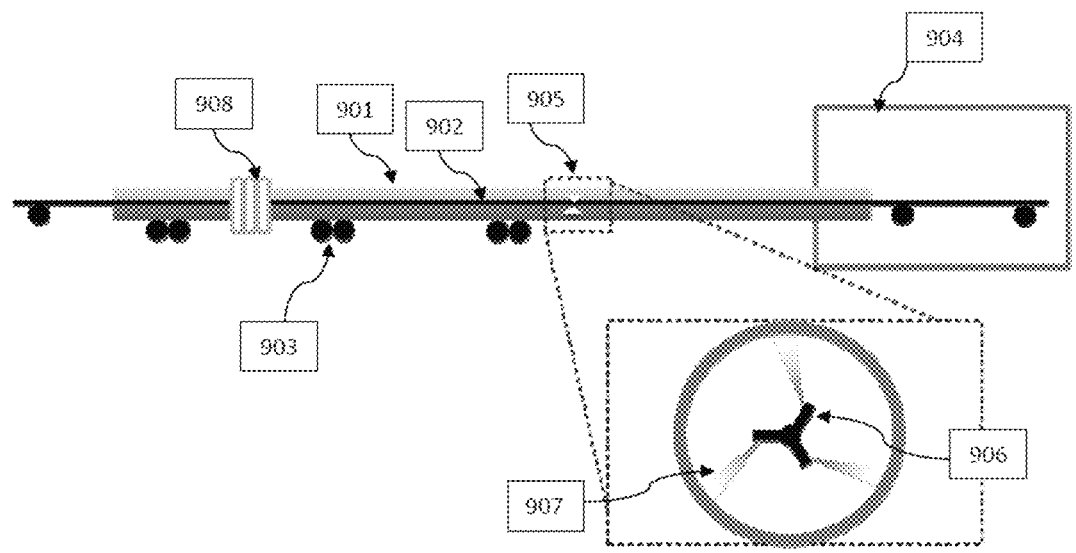
FIG. 11 is a diagram illustrating an embodiment of a method for coating interior of a pipe or tubing.

In another embodiment to provide coating protection for interiors of relatively long and relatively small diameter tubing, or for interior of equipment difficult geometries, the use of a carrier sheet is employed as illustrated in FIG. 11. The carrier sheet can be of the same or different composition from the substrate to be coated, having a sufficient thickness that allows the carrier sheet to bend and conform to the shape of the equipment to be protected. The carrier sheet has a surface area that is slightly larger than the surface area of the substrate to be coated with the brazing alloy composition.

In one embodiment, the carrier sheet has a thickness ranging from 0.5-100 mils. In a second embodiment, a thickness of 5-50 mils. In one embodiment, the carrier sheet comprises carbon steel. In another embodiment, the carrier sheet comprises stainless steel. After the carrier sheet is coated with the brazing alloy composition, it is then placed onto the equipment to be coated with adjacent or slightly overlapping edges, with the brazing alloy coating surface to be in intimate contact with the substrate to be protected. In a heat treatment step, the brazing material preferably melts and diffuses into the substrate to be coated.

In one embodiment for the coating of a plurality of tubings, a large carrier sheet can be used. After being coated with the brazing alloy composition, the carrier sheet is then cut into multiple smaller sheets each with a surface area sufficient to fully cover the interior or exterior of the tubings to be protected. The subsequent heat treatment step can be part of the quench and temper stage of the tubing, in a normal manufacturing process.

In one embodiment for the protection of a tubing interior, after the carrier sheet is placed within the tubing, a sufficient amount of external force in the form of another sheet (as a forming sheet) or a rod, etc., is applied against the carrier sheet to press the surface with the coating layer to be in intimate contact with the interior of the tubing.

As shown in the Figure, a flat and thin ductile sheet ("carrier sheet") 403 is sprayed with the brazing alloy 402 over the entire surface along one side of the sheet. In one embodiment, the carrier sheet is a flexible metal sheet, which forms the interior of the tubing and can be subsequently removed or corroded away on its own. The thermal spraying of such a geometry is simple and can be done quickly and in a relatively simple manner as compared to spraying interior pipe surfaces. Subsequently the sheet 403 is rolled up, and inserted into a piping 404 for the edges of the sheet 403 to overlap, and for the sheet to abut the piping 404 such that the brazing alloy coating 402 is positioned in contact with the interior surface of the pipe. Thus, if only one side of the sheet is sprayed, the uncoated side of the sheet is not in contact with the interior piping surface and faces the centerline of the tubing. The pipe 404 is then heat treated with a heat source 405 to a temperature which melts the brazing alloy coating 402 but not the pipe 404 or the sheet 403, forming a protective coating surface which is now sandwiched between the interior pipe walls and the carrier sheet 403.

In this process, the sheet 403 is used only as a carrier for the brazing material, which may be difficult itself to be formed into sheets, and requires no performance criteria such as corrosion performance. After the heating process, the carrier sheet 403 can be ground away, or left to provide some level of protection before being corroded or eroded away under the conditions the piping will be exposed to. Once the carrier sheet 403 is removed, the brazing alloy remains as a protective coating for enhanced corrosion/erosion resistance.

Properties: The substrate protected by the brazed coating layer is characterized as having increased protection properties, as the substrate is alloyed to a higher level with refractory elements that migrate from the brazed coating layer into the substrate in the heat treatment step. For a brazed coating of at least 10 mils (254 µm) and at a depth of 50 µm from the interface of the substrate/coating layer, the substrate has a total concentration of refractory elements of at least 2 wt. % in one embodiment; at a concentration of at least 5 wt. % in a second embodiment. In another embodiment, the substrate has a total concentration of refractory elements of at least 10 wt. % at a depth of 50 µm, and a total concentration of at least 5 wt. % at a depth of 100 µm.

As the brazed coating layer forms a metallurgical bond with the underlying substrate with the migration of the refractory elements, the coating is characterized as having an adhesion strength of at least 7000 psi (48 MPa) measured according to any of ASTM D4541 and ASTM D7234 in one embodiment; and at least 10,000 psi (70 MPa) in a second embodiment. The adhesion strength here is the average adhesion strength across the coating layer.

In one embodiment with a brazed coating of at least 10 mils, the coating layer forms a protective solid non-porous coating layer on the underlying substrate that is impermeable to corrosive environments, characterized as showing no pin holes, pitting (0/m2) in the ferroxyl test according to ASTM A967 Practice E.

Applications: The coatings and methods for applying coatings are particularly suitable for the protection of work pieces, etc., in any of erosive, corrosive, and abrasive environments. In one embodiment, the coating is particularly suitable for use in protecting steel components subject to environments containing sulfur and abrasive sand. In another embodiment, the coating further provides protection for the underlying equipment/substrate with any of wear resistance, heat resistance, insulation, shielding, and conductivity characteristics.

In one embodiment, the coating is for the protection of equipment in the energy and power generation industries, e.g., sections within a coil fired boiler subject to chloride and/or sulfide corrosion as well as erosion attack with produced fly ash, utility boiler waterwall panels, tubes for waste heat exchangers, sulfur recovery boilers, ethylene furnace tubes, metal sheets, by-pass liners. The coating can also be used as a hard chrome alternative and is a cost effective replacement for cladding for use in mining, concrete and cement, paper and pulp processing, chemical processing, and marine applications. In yet another embodiment, the coating is suitable for the protection of mild steel tubing for use in the oil and gas industry (e.g., downhole tubing).

Mild steel equipment, e.g., tubing, is ubiquitous in the oil and gas industry, but does not perform adequately in certain erosive/corrosive applications, including but not to sulfur-containing environments and down-hole exploration. Instead of using a more expensive bulk component such as higher alloy steels such as 9Cr, 11Cr, etc. for some sulfur-containing environments, cost and performance can be optimized using the coatings described herein to protect mild steel equipment.

Brazing Examples: The following illustrative examples are intended to be non-limiting.

Figure 13:
FIG. 13 is a diagram illustrating the coating of a substrate with an embodiment of the brazing alloy as a "button."

Brazing Example 1: A number of brazing alloy buttons (15 g each) comprising compositions Brazing alloy 1-Brazing alloy 7 were fabricated and placed on carbon steel coupons. After heat treatment to a temperature of 1190-1225° C. (2175-2240° F.), it was observed that the brazing alloys had melted and flowed across the carbon steel surface and beyond the original point of contact, creating a coating on the coupon surface as illustrated in FIG. 13.

Brazing Example 2: 1/16" cored wire was formed from a brazing alloy composition of: Fe (61.7%); Cr (12%); Nb (5%); V (5%); Si (3.6%); B (2.75%); and Al (10%). The material was thermal sprayed onto two steel coupons (4"×4"×0.25") surface using the twin wire arc spray technique to a thickness of 15 mils. The two coupons was inserted into a vacuum furnace and heat treated temperatures of 1190° C. (coupon "A") and 1225° C. (coupon "B") respectively, and held at the elevated temperature for 15-30 min. The heating resulted in the homogenization for a coating that provides corrosion resistance against sulfur-containing corrosive species.

Brazing Example 3: Example 2 was repeated with a 1/16" cored wire formed from a brazing alloy composition of: Fe (65.9%); Cr (24.6%); Mo (4.6%); Si (1.5%); Mn (1.2%) and B (2.2%).

Brazing Example 4: 1/16" cored wire was formed from a brazing alloy composition of: Fe (65.9%); Cr (24.6%); Mo (4.6%); Si (1.5%); Mn (1.2%) and B (2.2%). The material was thermal sprayed using the twin wire arc spray technique onto a 0.005" thick 430 stainless steel foil, which was wrapped around a 3.5-4.5" pipe at a thickness of 10-30 mils. The stainless steel foil was hose clamped to the pipe during the spray process at each free end. After the desired thickness was achieved, the hose clamps were removed. The sprayed foil was inserted into a second 3.5-4.5" pipe such that the thermal spray coating was in contact with the inner diameter of the second steel pipe.

A thicker 25 mil foil was then wrapped into a cylindrical shape and inserted into the assembly (2nd steel pipe with interior foil) such that the 25 mil foil was actively pressing the foil up against the interior walls due to its tendency to expand into a flat sheet. The entire assembly (2nd steel pipe+interior sprayed 5 mil foil+25 mil foil) was inserted into a vacuum furnace and heat treated to a temperature of 1190° C.-1225° C. and held at that elevated temperature for 15-30 min, resulting in the homogenization of the steel plate.

At the conclusion of this heat treatment (after the assembly has been allowed to cool), the 25 mil interior foil was removed from the center of the pipe and discarded. The 5 mil foil was metallurgically bound to the interior of the pipe allowing with the coating material, providing a corrosion resistant coating against sulfur-containing corrosive species particularly useful for sour service oil and gas upstream applications.

Brazing Example 5: Brazing Example 4 was repeated with a 1/16" cored wire having a composition of Fe (63.4%); Cr (9.4%); Mo (12.5%); B (1.8%); C (2.5%); and W (10.4%), for a pipe having an interior erosion resistant coating against flowing sand particles, particularly useful for oil and gas upstream applications.

Brazing Example 6: A number of steel coupons were coated with a steel alloy composition of: Fe—60.8%, Cr—22.1%, Mo—9.5%, Si—3.6%, B—2.8%, Al—1.1% (Brazing alloy 1) for coating of 15 mils thick, then heat treated at 1190° C. or 1225° C. for 30 minutes in a vacuum furnace. Ferroxyl exposure test according to ASTM A967 Practice E was conducted. Permeability in a ferroxyl exposure test is indicated by formation of blue spots on surface of samples, which is the result of the ferroxyl solution penetrating the coating thickness and reacting with the steel substrate. However, the samples showed no permeability to the mild steel substrate with the ferroxyl solution remained yellow during the duration of the test.

Brazing Example 7: Example 6 was duplicated, but the steel coupons were coated with a nickel alloy having a composition of: Ni—57%, B—0.4%, Si—1%, Cr—27.6%, Mo—14%. The coupons showed permeability with the formation of blue spots on the coating surface.

Brazing Example 8: Example 6 was duplicated but the coating was not heat treated. Ferroxyl exposure test was carried out with the coupons having as-sprayed coatings. The coupons showed permeability.

Brazing Example 9: Example 6 was duplicated and the steel coupon was coated with Brazing alloy 3: Fe—56.8%, Cr—21.6%, Mo—12.8%, Si—5.6%, B—2.2%, Al—1.1%. After heat treatment, it was noted that the Cr, Si, and Al species selectively diffused into the steel substrate. However, the Mo due to its large size and preference to react with Si preferentially formed molybdenum disilicide, MoSi2 and remained in the coating layer. MoSi2 is a common engineering ceramic which has additional uses beyond its inherent thermal insulating properties, such as high oxidation resistance and high temperature strength. The Mo content in the coating layer increased at least 5% as a result of the heat treatment.

Figures 14A, 14B:
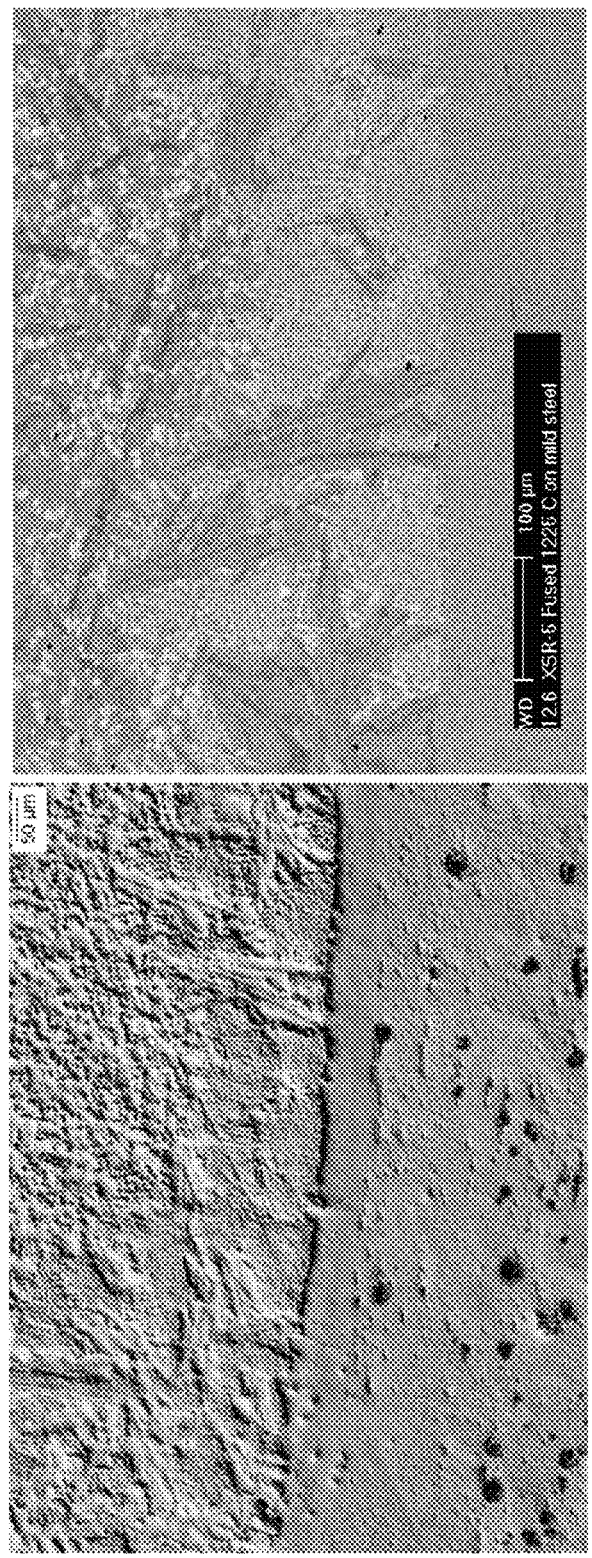
FIG. 14A is an optical micrograph and FIG. 14B is a scanning electron micrograph showing an embodiment of the interface of a coating formed on a mild steel substrate.

Brazing Example 10: Micro-structural evaluation of a carbon steel coupon formed with a 15 mil thermal sprayed coating of Brazing alloy 1 (Fe—60.8%, Cr—22.1%, Mo—9.5%, Si—3.6%, B—2.8%, Al—1.1%) and fused at 1225° C. for 15 minutes. FIG. 14A is an optical micrograph, and FIG. 14B is a scanning electron micrograph (SEM). As shown in the SEM, the brazing alloy in fused condition formed a concentrated chromium phase (phase 1) and a concentrated refractory phase (phase 2). These phases form a needle-like structure at the interface and develop into a block-like structure over 100 μm into the alloy coating as shown.

Figure 7:
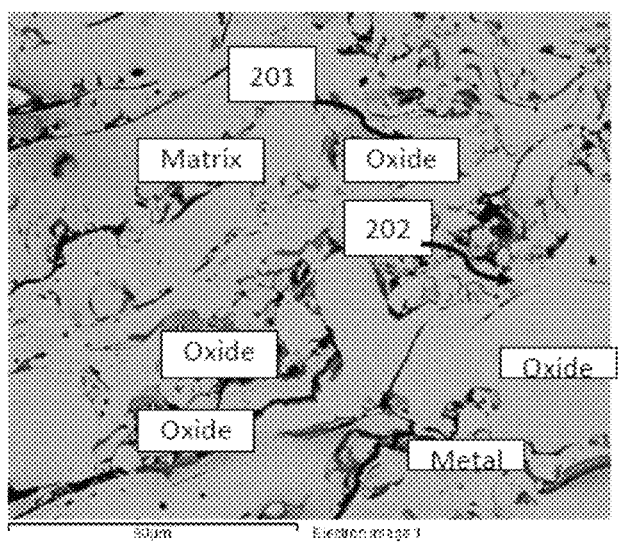
FIG. 7 is a micrograph from an energy dispersive spectroscopy (EDS) study showing the selective elemental oxide formation in an embodiment of the invention.
Figure 15:
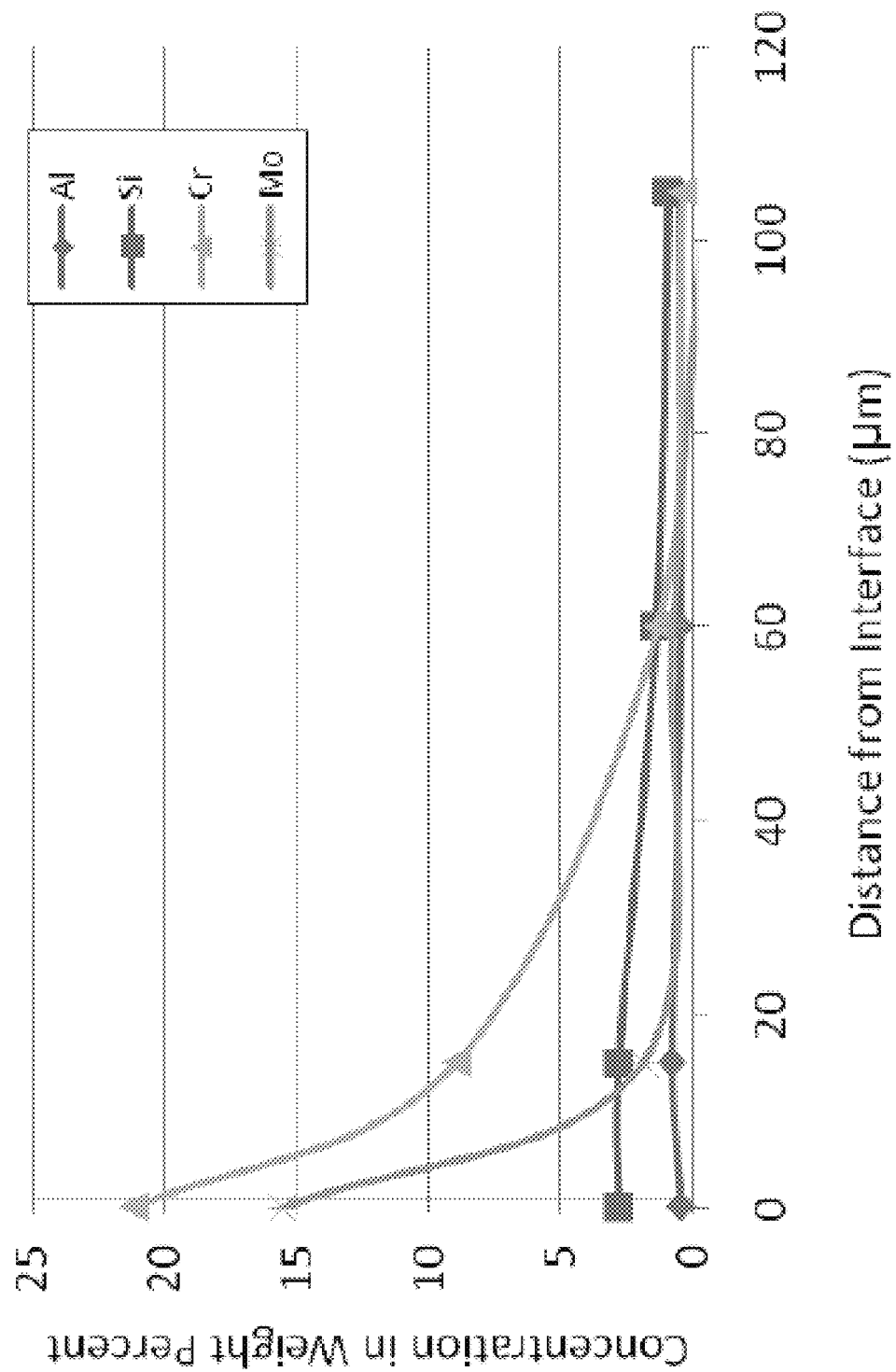
FIG. 15 is a graph from an energy dispersive spectroscopy (EDS) evaluation showing diffusion of alloying elements across the interface in FIGS. 14A-14B.
Figure 16:
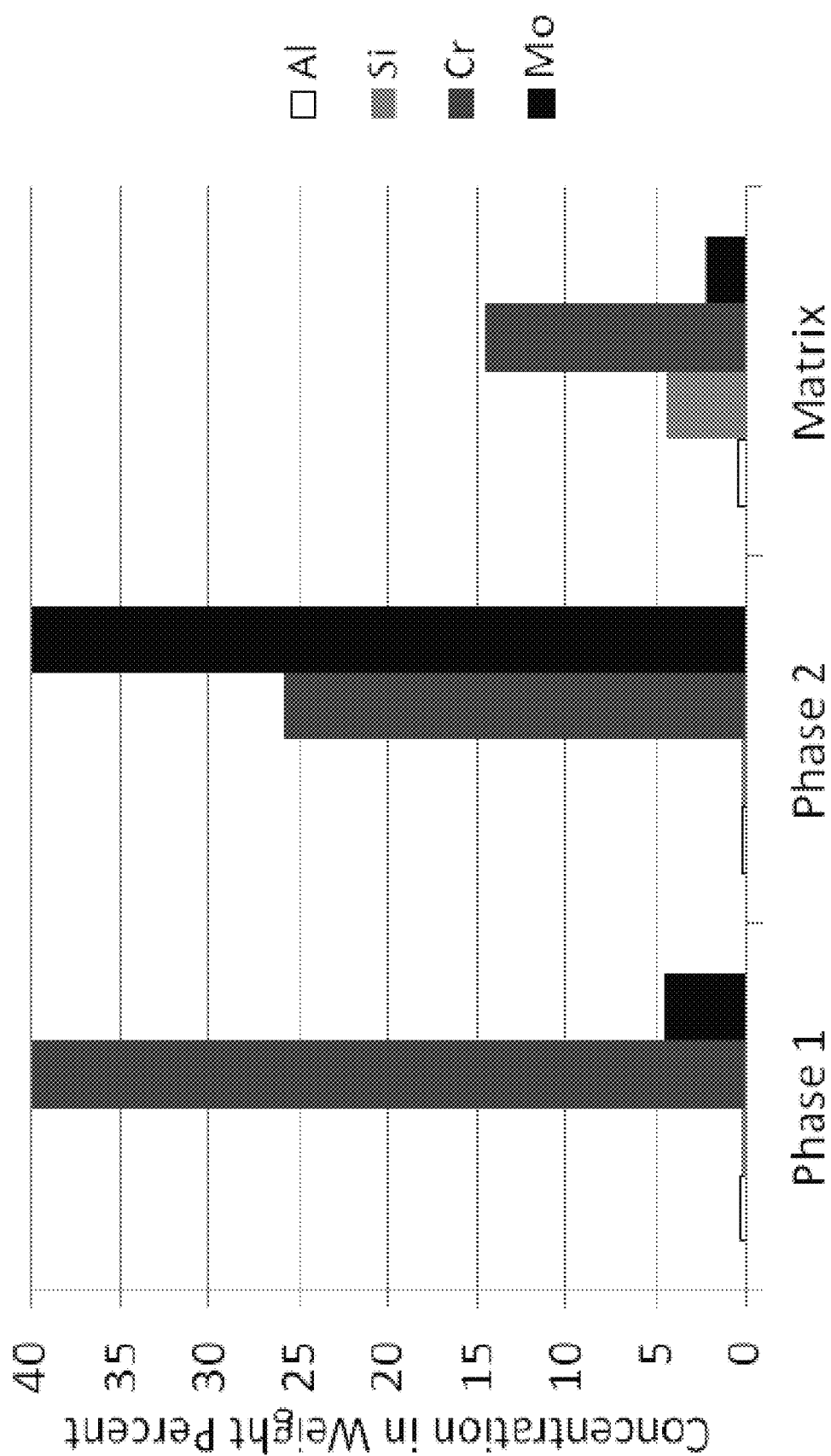
FIG. 16 is another graph from the EDS evaluation showing the chemistry of the phases in the alloy coating of FIGS. 14A-14B.

Energy dispersive spectroscopy (EDS) evaluation was carried out, and results are illustrated in the graphs of FIGS. 6 and 7. FIG. 15 shows the diffusion of the alloying elements measured as a function of the distance away from the interface and travelling into the bulk of the substrate. FIG. 16 shows the chemistry of the phases within the fused alloy coating layer. As shown, the refractory element Cr most effectively fused into the carbon steel substrate, followed by Si and Mo. The retained Mo content in the alloy coating matrix was 2.2 wt. %. The concentration of Mo and Si are minimal in the bulk of the substrate.

Brazing Example 11: In this example, micro-structural and EDS evaluations were conducted on a carbon steel coupon formed with a 15 mil thermal spray coating of Brazing alloy 2 (Fe—60.8%, Cr—22.1%, Nb—4.8%, V—4.8%, Si—3.6%, B—2.8%, Al—1.1%), fused at 1225° C. for 15 minutes.

Figures 17A, 17B:
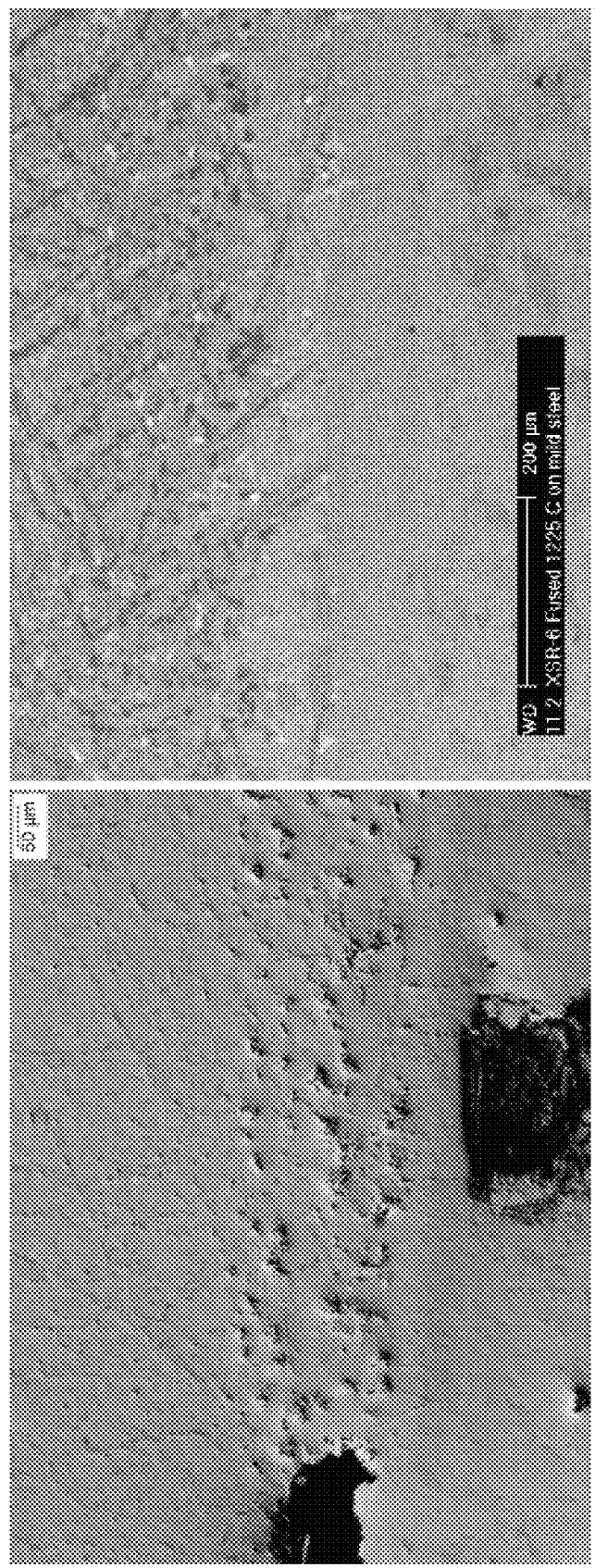
FIG. 17A is an optical micrograph and FIG. 17B is a scanning electron micrograph showing another embodiment of the interface of a coating formed on a mild steel substrate.
Figure 18:
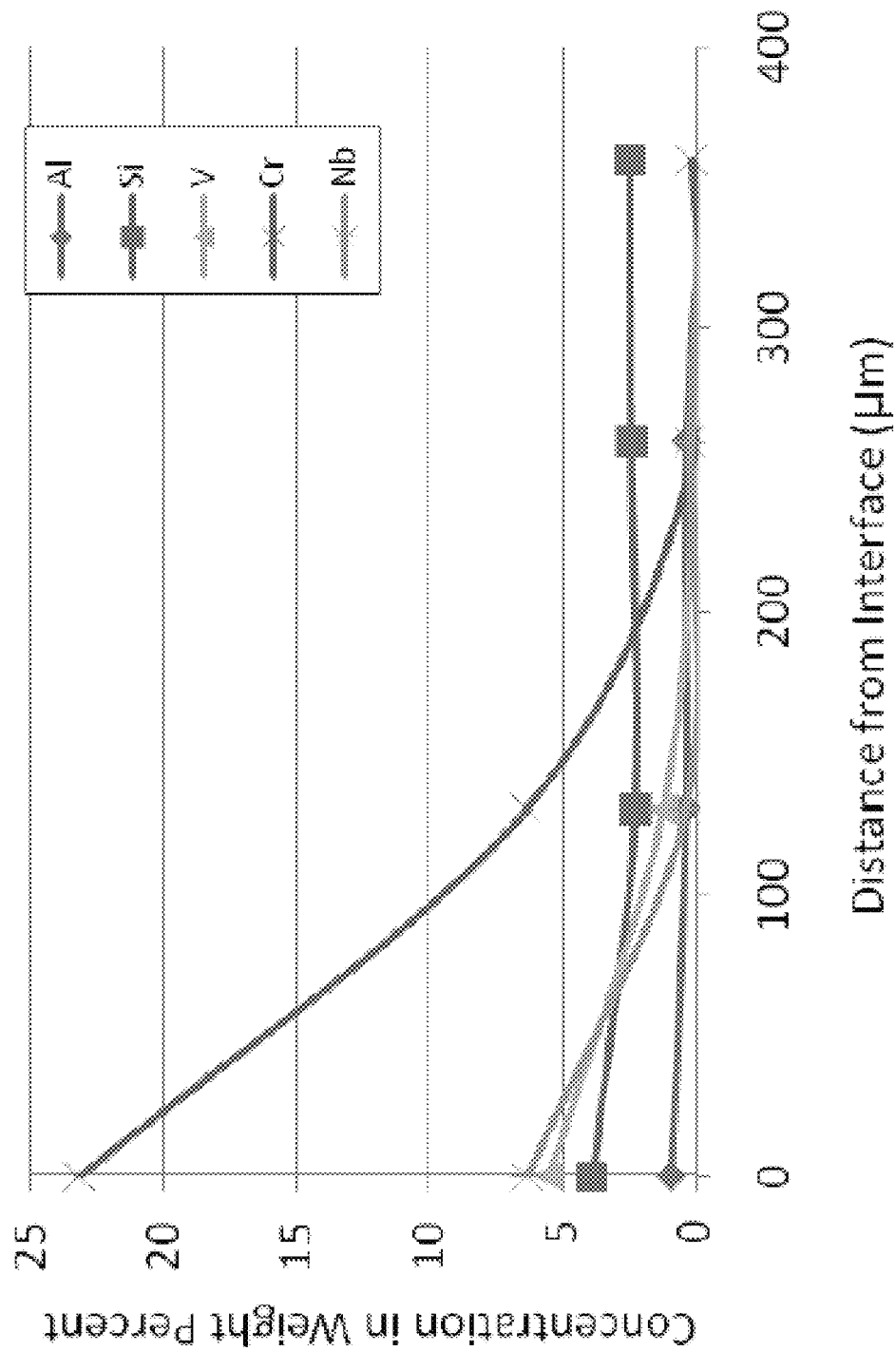
FIG. 18 is a graph from an energy dispersive spectroscopy (EDS) evaluation showing diffusion of alloying elements along the interface of FIGS. 17A-17B.
Figure 19:
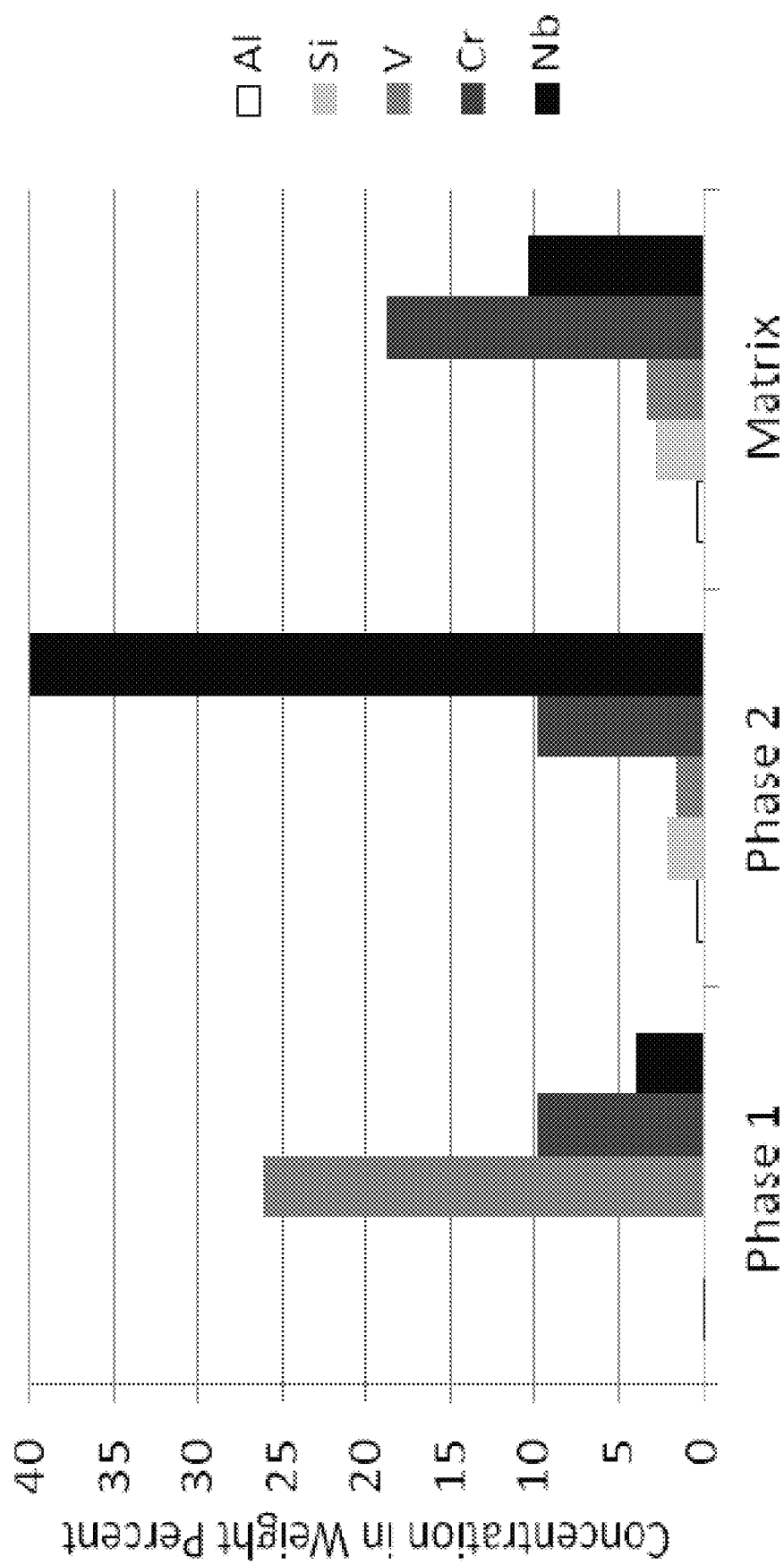
FIG. 19 is another graph from the EDS evaluation showing the chemistry of the phases in the alloy coating of FIGS. 17A-17B.

FIG. 17A is an optical micrograph, and FIG. 17B is a scanning electron micrograph (SEM). The white phase in the SEM is likely NbB, and the dark phase is likely a V borocarbide phase. The EDS in FIG. 18 shows extensive diffusion of Cr and Si into the carbon steel substrate, with elevated levels of Cr (5 wt %) and Si (3-4%) at distance of 100 μm into the substrate, expected to provide excellent corrosion resistance properties. Furthermore as shown in FIG. 100, the total refractory content in the coating matrix remained relatively high after fusing at ~13.5 wt. % (10.25 wt. % Nb and 3.25 wt. % V).

Still further embodiments of the invention provide wear-resistant metal alloy compositions. The wear-resistant metal alloys may comprise (in wt. %): Ni—balance; Cr—28; Mo—11; B—0.4; Si—1; Ti—0; and Al 0. In another embodiment, the wear-resistant meal alloy is an Fe-based composition with: Fe—balance; V—5; Nb—5; Mo—0; Cr—12; B—2.75; Al—10; and Si—3.6. In another embodiment, the Fe-based composition comprises: Fe—balance; V—0; Nb—0; Mo—4.6; Cr—24.6; B—2.75; Al—0; and Si—1.4, Mn—1.2. These wear-resistant alloys may be provided in the form of feedstock, such as welding or thermal spray feedstock—for example, as cored or solid wire, or as a powder. Alternatively, the feedstock may comprise a composition having a formulation such that the coating formed after application has the one of these compositions.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A nickel based thermal spray feedstock material comprising:
   between 12 and 25 wt. % Cr;
   between 2 and 15 wt. % Mo;
   between 0.25 and 12 wt. % Al;
   between 4.83 and 10 wt. % Si;
   between 0 and 5 wt. % Ti; and
   Ni;
   wherein the nickel based thermal spray feedstock material is configured to form an austenitic nickel phase structure and is characterized by having:
      at least 75% volume fraction in the form of the austenitic nickel phase structure; and
      at least some of the Si, Ti, or Al is in the form of metallic Si, Ti, or Al; and
   wherein the nickel based thermal spray feedstock material is at least one of a first wire, a second wire, or a combination of the first and second wires.

2. The nickel based thermal spray feedstock material of claim 1, wherein the nickel based thermal spray feedstock material comprises between 8 and 15 wt. % Mo.

3. The nickel based thermal spray feedstock material of claim 1, wherein the total amount of Si, Ti, and Al is less than or equal to 12 wt. %.

4. The nickel based thermal spray feedstock material of claim 1, wherein the total concentration of Si, Ti, and Al is between 5.08 and 20% and the concentration of Al is less than or equal to 10%.

5. The nickel based thermal spray feedstock material of claim 1, wherein the total concentration of Si, Ti, and Al is between 5.08 and 10% and the concentration of Al is less than or equal to 7%.

6. The nickel based thermal spray feedstock material of claim 1, wherein the nickel based thermal spray feedstock material comprises:
   between 20 and 20.4 wt. % Cr;
   between 8.64 and 12.7 wt. % Mo;
   between 1.85 and 3 wt. % Al; and
   between 0.15 and 1 wt. % Ti.

7. The nickel based thermal spray feedstock material of claim 1, wherein the first or second wire is at least one of a welding wire or thermal spray wire.

8. The nickel based thermal spray feedstock material of claim 7, wherein the welding wire or thermal spray wire is a cored welding or thermal spray wire.

9. The nickel based thermal spray feedstock material of claim 8, wherein the cored welding or thermal spray wire comprises a sheath comprising a Ni, a Ni—Cr alloy, or a Ni—Cr—Mo alloy.

10. The nickel based thermal spray feedstock material of claim 1, wherein the nickel based thermal spray feedstock material comprises both the first and second wires.

11. The nickel based thermal spray feedstock material of claim 10, wherein the first or second wire is a cored welding wire or thermal spray wire.

12. The nickel based thermal spray feedstock material of claim 11, wherein the cored welding wire or thermal spray wire comprises:
   a sheath comprising a Ni, a Ni—Cr, or a Ni—Cr—Mo alloy; and
   a powder feedstock comprising Mo, Al, Si, or Ti.

13. A coating formed from the nickel based thermal spray feedstock material of claim 1, the coating having a coating composition.

14. The coating of claim 13, wherein the coating tests negatively in a ferroxyl test according to ASTM A967 Practice E.

15. The coating of claim 13, wherein, when applied using a thermal spray process, the coating has at least 10% less Al than the amount of Al in the nickel based thermal spray feedstock material.

16. The coating of claim 13, wherein at least some of the Si, Ti, or Al in the coating is in the form of oxides, nitrides, carbo-nitrides, carbides, or complexes thereof.

17. A thermal spray feedstock material consisting of:
   between 12 and 25 wt. % Cr;
   between 2 and 15 wt. % Mo;
   between 0.25 and 12 wt. % Al;
   between 4.83 and 10 wt. % Si;
   between 0 and 5 wt. % Ti; and
   a balance of Ni;
   wherein the thermal spray feedstock material is configured to form an austenitic nickel phase structure and is characterized by having, a microstructure exhibiting at least 75% volume fraction in the form of the austenitic nickel phase structure.

18. The thermal spray feedstock material of claim 17, wherein the thermal spray feedstock material is formed from:
   a first wire; and
   a second wire.

19. The thermal spray feedstock material of claim 18, wherein the first or second wire is a cored welding wire or thermal spray wire.

20. A coating formed from the thermal spray feedstock material of claim 17, the coating having a coating composition.

* * * * *